(12) United States Patent
Pleros et al.

(10) Patent No.: US 11,817,903 B2
(45) Date of Patent: *Nov. 14, 2023

(54) COHERENT PHOTONIC COMPUTING ARCHITECTURES

(71) Applicant: Celestial AI Inc., Sunnyvale, CA (US)

(72) Inventors: Nikolaos Pleros, Salonika (GR); David Lazovsky, Los Gatos, CA (US); George Giamougiannis, Salonika (GR); Apostolos Tsakyridis, Salonika (GR); Angelina Totovic, Central Macedonia (GR)

(73) Assignee: Celestial AI Inc., Santa Clara, CA (US)

( * ) Notice: Subject to any disclaimer, the term of this patent is extended or adjusted under 35 U.S.C. 154(b) by 32 days.

This patent is subject to a terminal disclaimer.

(21) Appl. No.: 17/395,849

(22) Filed: Aug. 6, 2021

(65) Prior Publication Data

US 2022/0045757 A1    Feb. 10, 2022

Related U.S. Application Data

(60) Provisional application No. 63/062,163, filed on Aug. 6, 2020.

(51) Int. Cl.
*H04J 14/00* (2006.01)
*H04B 10/27* (2013.01)
(Continued)

(52) U.S. Cl.
CPC ............. *H04B 10/27* (2013.01); *G02F 1/225* (2013.01); *G06N 3/04* (2013.01); *H04B 10/07* (2013.01); *H04Q 11/0005* (2013.01)

(58) Field of Classification Search
CPC ......... H04B 10/27; H04B 10/07; G02F 1/225; G06N 3/04; H04Q 11/0005
See application file for complete search history.

(56) References Cited

U.S. PATENT DOCUMENTS 4,934,775 A * 6/1990 Koai .................. H04Q 11/0005
385/16
5,457,563 A * 10/1995 Van Deventer ........ H04B 10/64
398/204

(Continued)

FOREIGN PATENT DOCUMENTS

AU       2019100030 A     2/2019
AU       2019100679 A     8/2019

(Continued)

OTHER PUBLICATIONS

PCT/US2023/015680, Mar. 20, 2023, Bos et al.
(Continued)

*Primary Examiner* — Pranesh K Barua
(74) *Attorney, Agent, or Firm* — RAY QUINNEY & NEBEKER P.C.; Paul N. Taylor

(57) ABSTRACT

Disclosed are coherent photonic circuit architectures that optically implement linear algebraic computations. In neuromorphic applications of such photonic circuit architectures, individual neural network layers can be implemented by coherent optical linear neurons in a crossbar configuration, integrated with electronic circuitry at the interfaces between neural network layers to determine the neuron inputs to one layer based on the neuron outputs of the preceding layer. Wavelength division multiplexing can be used to efficiently implement certain specific network models, optionally in conjunction with electro-optic switches to render a generic hardware configuration programmable.

28 Claims, 9 Drawing Sheets

(51) Int. Cl.
  *H04Q 11/00* (2006.01)
  *H04B 10/07* (2013.01)
  *G02F 1/225* (2006.01)
  *G06N 3/04* (2023.01)

(56) References Cited

U.S. PATENT DOCUMENTS

| | | | |
|---|---|---|---|
| 6,249,621 | B1 | 6/2001 | Sargent et al. |
| 6,714,552 | B1 | 3/2004 | Cotter |
| 7,778,501 | B2 | 8/2010 | Beausoleil et al. |
| 7,889,996 | B2 | 2/2011 | Zheng et al. |
| 7,894,699 | B2 | 2/2011 | Beausoleil |
| 7,961,990 | B2 | 6/2011 | Krishnamoorthy et al. |
| 8,064,739 | B2 | 11/2011 | Binkert et al. |
| 8,213,751 | B1 | 7/2012 | Ho et al. |
| 8,260,147 | B2 | 9/2012 | Scandurra et al. |
| 8,285,140 | B2 | 10/2012 | Mccracken et al. |
| 8,326,148 | B2 | 12/2012 | Bergman et al. |
| 8,340,517 | B2 | 12/2012 | Shacham et al. |
| 8,447,146 | B2 | 5/2013 | Beausoleil et al. |
| 8,611,747 | B1 | 12/2013 | Wach |
| 9,036,482 | B2 | 5/2015 | Lea |
| 9,369,784 | B2 | 6/2016 | Zid et al. |
| 9,495,295 | B1 | 11/2016 | Dutt et al. |
| 9,831,360 | B2 | 11/2017 | Knights et al. |
| 9,882,655 | B2 | 1/2018 | Li et al. |
| 10,031,287 | B1 | 7/2018 | Heroux et al. |
| 10,107,959 | B2 | 10/2018 | Heroux et al. |
| 10,117,007 | B2 | 10/2018 | Song et al. |
| 10,185,085 | B2 | 1/2019 | Huangfu et al. |
| 10,225,632 | B1 | 3/2019 | Dupuis et al. |
| 10,250,958 | B2 | 4/2019 | Chen et al. |
| 10,281,747 | B2 | 5/2019 | Padmaraju et al. |
| 10,365,445 | B2 | 7/2019 | Badihi et al. |
| 10,564,512 | B2 | 2/2020 | Sun et al. |
| 10,837,827 | B2 | 11/2020 | Nahmias et al. |
| 10,935,722 | B2 | 3/2021 | Li et al. |
| 10,951,325 | B1 | 3/2021 | Rathinasamy et al. |
| 10,976,491 | B2 | 4/2021 | Coolbaugh et al. |
| 11,165,509 | B1 | 11/2021 | Nagarajan et al. |
| 11,165,711 | B2 | 11/2021 | Mehrvar et al. |
| 11,233,580 | B2 | 1/2022 | Meade et al. |
| 11,500,153 | B2 | 11/2022 | Meade et al. |
| 2006/0159387 | A1 | 7/2006 | Handelman |
| 2010/0266295 | A1 | 10/2010 | Zheng et al. |
| 2015/0109024 | A1 | 4/2015 | Abdelfattah et al. |
| 2015/0354938 | A1 | 12/2015 | Mower et al. |
| 2017/0194310 | A1 | 7/2017 | Evans et al. |
| 2017/0207600 | A1 | 7/2017 | Klamkin et al. |
| 2018/0260703 | A1 | 9/2018 | Soljacic et al. |
| 2019/0026225 | A1 | 1/2019 | Gu et al. |
| 2019/0049665 | A1 | 2/2019 | Ma et al. |
| 2019/0205737 | A1 | 7/2019 | Bleiweiss et al. |
| 2019/0266088 | A1 | 8/2019 | Kumar |
| 2019/0266089 | A1 | 8/2019 | Kumar |
| 2019/0294199 | A1 | 9/2019 | Carolan et al. |
| 2019/0385997 | A1 | 12/2019 | Choi et al. |
| 2020/0125716 | A1 | 4/2020 | Chittamuru et al. |
| 2020/0250532 | A1* | 8/2020 | Shen .................. G06E 1/045 |
| 2020/0284981 | A1 | 9/2020 | Harris et al. |
| 2020/0409001 | A1 | 12/2020 | Liang et al. |
| 2021/0036783 | A1* | 2/2021 | Bunandar ............ H04B 10/801 |
| 2021/0064958 | A1 | 3/2021 | Lin et al. |
| 2021/0072784 | A1 | 3/2021 | Lin et al. |
| 2021/0116637 | A1 | 4/2021 | Li et al. |
| 2021/0132309 | A1 | 5/2021 | Zhang et al. |
| 2021/0132650 | A1 | 5/2021 | Wenhua et al. |
| 2021/0133547 | A1 | 5/2021 | Wenhua et al. |
| 2021/0257396 | A1 | 8/2021 | Piggott et al. |
| 2021/0286129 | A1 | 9/2021 | Fini et al. |
| 2022/0004029 | A1 | 1/2022 | Meng et al. |
| 2022/0012582 | A1 | 1/2022 | Pleros et al. |
| 2022/0044092 | A1 | 2/2022 | Pleros et al. |
| 2022/0171142 | A1 | 6/2022 | Wright et al. |
| 2022/0263582 | A1 | 8/2022 | Ma et al. |

FOREIGN PATENT DOCUMENTS

| | | |
|---|---|---|
| AU | 2019100750 A | 8/2019 |
| CN | 102281478 A | 12/2011 |
| CN | 102333250 A | 1/2012 |
| CN | 102413039 A | 4/2012 |
| CN | 102638311 A | 8/2012 |
| CN | 102645706 A | 8/2012 |
| CN | 202522621 U | 11/2012 |
| CN | 103369415 A | 10/2013 |
| CN | 103442311 A | 12/2013 |
| CN | 103580890 A | 2/2014 |
| CN | 104539547 A | 4/2015 |
| CN | 105451103 A | 3/2016 |
| CN | 205354341 U | 6/2016 |
| CN | 105812063 A | 7/2016 |
| CN | 105847166 A | 8/2016 |
| CN | 106126471 A | 11/2016 |
| CN | 106331909 A | 1/2017 |
| CN | 106407154 A | 2/2017 |
| CN | 106533993 A | 3/2017 |
| CN | 106549874 A | 3/2017 |
| CN | 106888050 A | 6/2017 |
| CN | 106911521 A | 6/2017 |
| CN | 106936708 A | 7/2017 |
| CN | 106936736 A | 7/2017 |
| CN | 106980160 A | 7/2017 |
| CN | 107911761 A | 4/2018 |
| CN | 108599850 A | 9/2018 |
| CN | 207835452 U | 9/2018 |
| CN | 108737011 A | 11/2018 |
| CN | 110266585 A | 9/2019 |
| CN | 110505021 A | 11/2019 |
| CN | 111208690 A | 5/2020 |
| CN | 111752891 A | 10/2020 |
| CN | 111770019 A | 10/2020 |
| CN | 111786911 A | 10/2020 |
| FR | 3007537 A | 12/2014 |
| IN | 201621017235 A | 7/2016 |
| IN | 202121008267 A | 4/2021 |
| JP | 6747660 B | 8/2020 |
| KR | 101242172 B | 3/2013 |
| KR | 101382606 B | 4/2014 |
| KR | 101465420 B | 11/2014 |
| KR | 101465498 B | 11/2014 |
| KR | 101541534 B | 8/2015 |
| KR | 101548695 B | 9/2015 |
| KR | 101766786 B | 8/2017 |
| KR | 101766792 B | 8/2017 |
| WO | WO2015176289 | 11/2015 |
| WO | WO2020072925 | 4/2020 |
| WO | WO2020102204 | 5/2020 |
| WO | WO-2020191217 A1 | 9/2020 |
| WO | WO-2021021787 A1 | 2/2021 |
| WO | WO-2022032105 A1 | 2/2022 |
| WO | WO2022133490 | 6/2022 |

OTHER PUBLICATIONS

U.S. Appl. No. 18/123,161, filed Mar. 17, 2023, Bos et al.
U.S. Appl. No. 18/123,170, filed Mar. 17, 2023, Sahni.
U.S. Appl. No. 63/428,663, filed Nov. 29, 2022, Sahni et al.
U.S. Appl. No. 63/441,689, filed Jan. 27, 2023, Winterbottom.
PCT/US2022/042621, Feb. 15, 2023, International Search Report and Written Opinion.
"International Application Serial No. PCT/US2021/044956, International Search Report dated Nov. 19, 2021", 4 pgs.
"International Application Serial No. PCT/US2021/044956, Written Opinion dated Nov. 19, 2021", 7 pgs.
"International Application Serial No. PCT/US2021/073003, International Search Report dated Mar. 22, 2022", 5 pgs.
"International Application Serial No. PCT/US2021/073003, Written Opinion dated Mar. 22, 2022", 8 pgs.
Agrawal, Govind, "Chapter 4—Optical Receivers", Fiber-Optic Communications Systems, John Wiley & Sons, Inc., (2002), 133-182.

(56) References Cited

OTHER PUBLICATIONS

Burgwal, Roel, et al., "Using an imperfect photonic network to implement random unitaries,", Opt. Express 25(23), (2017), 28236-28245.
Capmany, Francoy, et al., "The programmable processor.", Nature Phontonics 10:6, (2016), 5 pgs.
Carolan, Jacques, et al., "Universal Linear Optics", arXiv:1505.01182v1, (2015), 13 pgs.
Clements, William, et al., "Optimal design for universal multiport interferometers", Optica, vol. 3, No. 12, (2016), 1460-1465.
Eltes, Felix, et al., "A BaTiO3-Based Electro-Optic Pockels Modulator Monolithically Integrated on an Advanced Silicon Photonics Platform", J. Lightwave Technol. vol. 37, No. 5, (2019), 1456-1462.
Eltes, Felix, et al., "Low-Loss BaTiO3—Si Waveguides for Nonlinear Integrated Photonics", ACS Photon., vol. 3, No. 9, (2016), 1698-170.
Harris, N C, et al., "Efficient, compact and low loss thermo-optic phase shifter in silicon", Opt. Express, vol. 22, No. 9, (2014), 7 pgs.
Jiang, W, "Nonvolatile and ultra-low-loss reconfigurable mode (De)multiplexer/switch using triple-waveguide coupler with Ge2Sb2Se4Te1 phase change material,", Sci. Rep., vol. 8, No. 1, (2018), 12 pgs.
Lambrecht, Joris, et al., "90-GB/s NRZ Optical Receiver in Silicon Using a Fully Differential Transimpedance Amplifier,", Journal of Lightwave Technology, vol. 37, No. 9, (2019), 1964-1973.
Manolis, A, et al., "Non-volatile integrated photonic memory using GST phase change material on a fully etched Si3N4/SiO2 waveguide", Conference on Lasers and Electro-Optics, OSA Technical Digest, paper STh3R.4, (2020), 2 pgs.
Miller, David A, "Perfect optics with imperfect components", Optica, vol. 2, No. 8, (2015), 747-750.
Miller, David A, et al., "Self-Configuring Universal Linear Optical Component", Photon. Res. 1, [Online]. Retrieved from the Internet: <URL: https://arxiv.org/ftp/arxiv/papers/1303/1303.4602.pdf>, (2013), 1-15.
Miscuglio, Mario, et al., "Photonic Tensor cores for machine learning", Applied Physics Reviews vol. 7, Issue 3. arXiv:2002.03780, (2020), 16 pgs.
Mourgias-Alexandris, G, et al., "An all-optical neuron with sigmoid activation function", Optics Express, vol. 27, No. 7, (Apr. 2019), 11 pgs.
Mourgias-Alexandris, George, et al., "Neuromorphic Photonics with Coherent Linear Neurons Using Dual-IQ Modulation Cells", Journal of Lightwave Technology. vol. 38, No. 4, (Feb. 15, 2020), 811-819.
Pai, Sunil, et al., "Parallel Programming of an Arbitrary Feedforward Photonic Network,", IEEE Journal of Selected Topics in Quantum Electronics, vol. 26, No. 5, (2020), 13 pgs.
Perez, Daniel, et al., "Reconfigurable lattice mesh designs for programmable photonic processors", Optics Express vol. 24, Issue 11, (2016), 14 pgs.
Reck, M, et al., "Experimental Realization of any Discrete Unitary Operator", Phys. Rev. Lett. 73, (1994), 58-61.
Shen, Yichen, et al., "Deep learning with coherent nanophotonic circuits", https://arxiv.org/pdf/1610.02365.pdf, (2016), 8 pgs.
Shi, Bin, et al., "Numerical Simulation of an InP Photonic Integrated Cross-Connect for Deep Neural Networks on Chip", Applied Sciences, (Jan. 9, 2020), 1-15.
Shokraneh, Farhad, et al., "The diamond mesh, a phase-error- and loss-tolerant field-programmable MZI-based optical processor for optical neural networks", Opt. Express, 28(16), (2020), 23495-23508.
Sun, Chen, et al., "A 45 nm cmos-soi monolithic photonics platform with bit-statistics-based resonant microring thermal tuning,", EEE Journal of Solid-State Circuits, vol. 51, No. 4, (2016), 20 pgs.
Tait, Alexander, et al., "Broadcast and Weight: An Integrated Network for Scalable Photonic Spike Processing,", Journal of Lightwave Technology, vol. 32, No. 21, (2014), 4029-4041.
Yang, Lin, et al., "On-chip CMOS-compatible optical signal processor", Opt. Express 20(12), (2012), 13560-13565.
Zhuang, L, et al., "Programmable photonic signal processor chip for radiofrequency applications", Optica 2, 854-859, (2015), 10 pgs.
U.S. Appl. No. 63/049,928, filed Jul. 9, 2020, Pleros et al.
U.S. Appl. No. 63/062,163, filed Aug. 6, 2020, Pleros et al.
U.S. Appl. No. 63/199,286, filed Dec. 17, 2020, Ma et al.
U.S. Appl. No. 63/199,412, filed Dec. 23, 2022, Ma et al.
U.S. Appl. No. 63/201,155, filed Apr. 15, 2021, Ma et al.
U.S. Appl. No. 63/261,974, filed Oct. 1, 2021, Pleros et al.
U.S. Appl. No. 63/212,353, filed Jun. 18, 2021, Winterbottom et al.
U.S. Appl. No. 17/807,692, filed Jun. 17, 2022, Winterbottom et al.
PCT/US2022/073039, Jun. 17, 2022, Winterbottom et al.
U.S. Appl. No. 17/807,694, filed Jun. 17, 2022, Winterbottom et al.
U.S. Appl. No. 17/807,698, filed Jun. 17, 2022, Winterbottom et al.
U.S. Appl. No. 17/807,699, filed Jun. 17, 2022, Winterbottom et al.
U.S. Appl. No. 17/807,695, filed Jun. 17, 2022, Winterbottom et al.
U.S. Appl. No. 63/321,453, filed Mar. 18, 2022, Bos et al.
U.S. Appl. No. 17/903,455, filed Sep. 6, 2022, Lazovsky et al.
PCT/US2022/042621, Sep. 6, 2022, Lazovsky et al.
U.S. Appl. No. 17/957,731, filed Sep. 30, 2022, Pleros et al.
U.S. Appl. No. 17/957,812, filed Sep. 30, 2022, Pleros et al.
U.S. Appl. No. 63/420,323, filed Oct. 28, 2022, Sahni.
U.S. Appl. No. 63/420,330, filed Oct. 28, 2022, Sahni et al.
Ardestani, et al., "Supporting Massive DLRM Inference Through Software Defined Memory", Nov. 8, 2021; 14 pages.
PCT/US2022/073039, Sep. 1, 2022, Invitation to Pay Additional Fees.
PCT/US2022/073039, Dec. 2, 2022, International Search Report and Written Opinion.
U.S. Appl. No. 17/305,486, filed Jul. 8, 2021, Neuromorphic Photonics With Coherent Linear Neurons.
U.S. Appl. No. 17/395,903, filed Aug. 6, 2021, Coherent Photonic Computing Architectures.
U.S. Appl. No. 17/645,001, filed Dec. 17, 2021, Balanced Photonic Architectures for Matrix Computations.
International Search Report and Written Opinion, PCT/US2023/015680, dated Aug. 23, 2023, 22 pages.

* cited by examiner

US 11,817,903 B2

COHERENT PHOTONIC COMPUTING ARCHITECTURES

CROSS-REFERENCE TO RELATED APPLICATION

This application claims the benefit of and priority to U.S. Provisional Patent Application No. 63/062,163, filed on Aug. 6, 2020, which is hereby incorporated herein by reference.

TECHNICAL FIELD

This disclosure relates generally to photonic circuitry and architectures for computing applications, including, for example, for neuromorphic computing.

BACKGROUND

Photonic (or, synonymously, optical) computing has emerged as a promising candidate for sustaining computational advances as the growth in the computing performance of conventional von Neumann architectures, previously characterized by Moore's and Koomey's laws, has slowed down. Compared with electronic computations, photonics offers the potential for speed increases and energy savings; in fact, efforts to transfer computations from the electronic domain to the optical domain are in no small part inspired by the speed and energy benefits that photonics has already brought to the field of telecommunications and data communications.

Among the potential applications of photonic computing, one area that has attracted significant interest is the field of neuromorphic computing—a brain-inspired computing paradigm in which large-scale integrated analog or digital circuitry mimics neurobiological function. Various approaches to photonically implementing, in particular, linear artificial neural networks, which mathematically correspond to weighted algebraic summations over a set of neuron inputs, have been proposed. Many of the proposed approaches employ wavelength-division-multiplexing (WDM) schemes to encode every neuron input signal onto a different wavelength. While capable of demonstrating proof-of-principle optical implementation of linear neurons, these approaches do not scale well to higher numbers of neuron inputs due to the substantial increase in circuit complexity with each added wavelength, which severely limits their suitability for practically relevant applications. Additionally, many WDM schemes merely apply unsigned weights in the optical domain, and rely on optoelectronic conversion to enable addition or subtraction of the weighted signals in the electrical domain (e.g., using a pair of balanced photodetectors to sum over positive and negative weights), which impedes the subsequent employment of all-optical non-linear activation functions. An alternative previously proposed approach implements the linear algebraic summation by coherent electric-field addition—exploiting the phase of the optical carrier electric field for sign-encoding purposes—in a complex spatial layout that includes multiple cascaded Mach-Zehnder interferometers (MZIs), e.g., as described in U.S. Patent Application Publication No. 2018/0260703. While this coherent approach can yield single-wavelength and single-laser optical linear neurons, signal errors accumulate along the cascade of MZIs, which has so far precluded precision high enough, or bit error rates (BER) low enough, for large-scale practical applications.

BRIEF DESCRIPTION OF THE DRAWINGS

Disclosed herein are systems and photonic circuit architectures that optically implement linear algebraic computations, e.g., as used in artificial neural networks. Various example embodiments of the inventive subject matter are described with respect to the accompanying drawings, in which.

DETAILED DESCRIPTION

Figure 1:
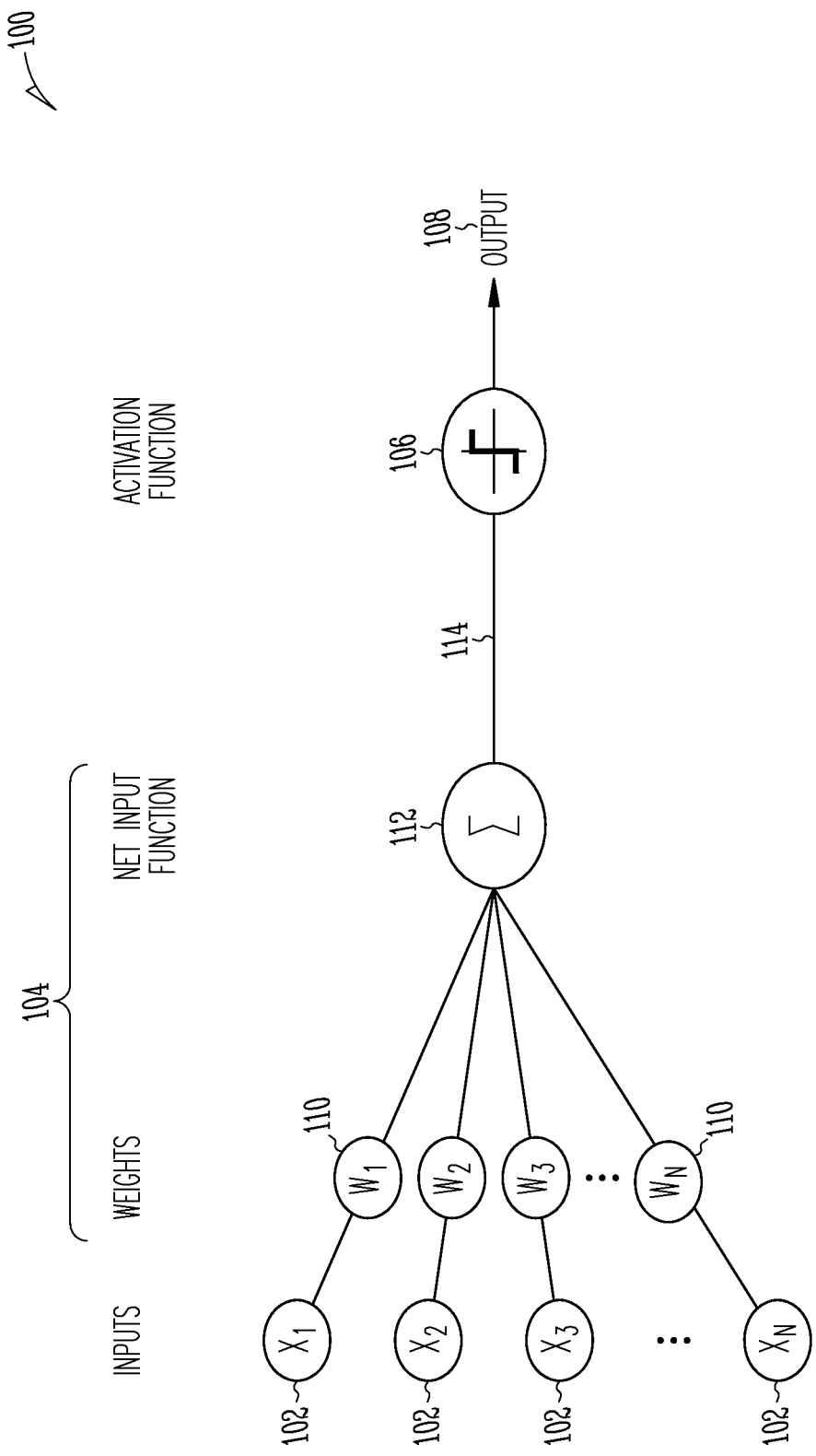
FIG. 1 is a diagram conceptually illustrating an example artificial neuron.

Presented herein are coherent photonic circuit architectures implementing linear algebraic computations, as well as hybrid photonic-electronic computing systems that integrate the photonic circuitry with electronic circuitry at the inputs, outputs, and/or interfaces between computational layers. Various embodiments are described, in particular, with reference to applications in neuromorphic computing, specifically the implementation of linear neurons and linear neural network layers. Mathematically, the operation of a linear neuron or neural network layer on a set of inputs corresponds to the weighted summation over the inputs using a set of weights associated with the neuron, or weighted summations over the inputs using multiple sets of weights associated with the neural network layer; these operations can also be described as the scalar product(s) of an input vector with a vector or matrix of weights. Accordingly, photonic implementations of linear algebraic computations (like vector-times-vector or vector-times-matrix operations) can be illustrated with reference to the example of linear neural networks without loss of generality.

The disclosed photonic circuit architectures are scalable to arbitrary numbers of inputs while affording high precision, and amenable to small-footprint, low-power and low-cost implementation as photonic integrated circuits (PICs) using standard silicon fabrication foundries and processes. The hybrid photonic-electronic systems incorporating such PICs provide a flexible computing platform that, when utilized in neuromorphic computing, can be adapted to many neural network models, and that allows implementing certain functionality, including, e.g., the non-linear activation functions, selectively in the photonic or electronic circuitry for performance optimization.

In accordance with various embodiments, the coherent photonic circuitry is built from an optical splitter that splits incoming carrier light into a plurality of optical carrier signals, "input cells" configured to impart computational inputs (e.g., neural input cells imparting neuron inputs) onto the optical carrier signals to generate optical input signals to a layer of computational weights (e.g., a neural network layer), "weighting cells" configured to impart the computational weights (e.g., neural weighting cells imparting neuron weights) onto the optical input signals, optical combiners to coherently combine the weighted optical input signals into optical output signals encoding the computational outputs (e.g., linear neuron outputs), photodetectors to measure the optical output signals and thereby transfer the computational outputs (hereinafter also simply "outputs") into the electronic domain, along with any additional coupling and waveguide infrastructure to connect the various listed components. The computational inputs and computational weights (hereinafter also simply "inputs" and "weights") are imparted onto the electric fields of the optical carrier signals, e.g., by optical amplitude modulators (such as, e.g., electro-absorption modulators) in conjunction with optical phase shifters that can encode the signs of the weights and/or inputs by zero or $\pi$ phase shifts. The optical input signals resulting from modulation of the optical carrier signal to impart the computational inputs are herein also referred to as "first modulated optical signals," and the weighted optical signals resulting from further modulating the optical input signals to impart the computational weights are herein also referred to as "second modulated optical signals." Optical signals are herein understood to be combined "coherently" if the combined signals are temporally aligned and, up to any phase difference imparted deliberately as part of the encoded input or weight (such as up to $\pi$ phase shifts that change the direction of the field amplitude to encode a negative sign), in phase. The coherent combination, or interference, of signals whose phases differ, if at all, in a $\pi$ phase shift results in the algebraic summation over the (signed) signal amplitudes. For a given set of neuron inputs, a single set of neural weighting cells associated with the respective inputs forms, along with the coupling and waveguide infrastructure effecting the coherent combination of the weighted input signals into an optical output signal, an implementation of a single linear optical neuron.

In various embodiments, the weighting cells are physically arranged in an array whose rows correspond to different respective computational inputs and receive optical input signals from respective input cells associated with the rows, and whose columns correspond to different respective computational outputs and include respective associated sets of weights. (The terms "rows" and "columns" are herein used merely to designate two dimensions of the array, regardless of the orientation of the array, and are arbitrarily associated with inputs and outputs, respectively. If the rows of the array are associated with the inputs and the columns with the outputs, the rows and columns of the array map directly onto the rows and columns of a matrix of weights multiplied from the left by the input vector.) In neural network applications, multiple columns, corresponding to multiple sets of weights, implement multiple respective neurons, or nodes, within a neural network layer.

In the array configuration of the weighting cells, a plurality of optical waveguides arranged along the rows may serve to carry the optical input signals from the neural input cells to the neural weighting cells; these waveguides are herein also referred to as "optical input waveguides" or simply "input waveguides." Further, in an example implementation of the optical combiners, a plurality of optical waveguides arranged along the columns, crossing the input waveguides, may serve to sequentially combine the weighted optical input signals output by the neural weighting cells along each column into a respective output signal for the column; these waveguides are herein also referred to as "optical output waveguides" or simply "output waveguides." In this photonic crossbar configuration, each weighting cell is coupled between one of the input waveguides and one of the output waveguides.

To effect the coherent addition of the weighted optical input signals along each column, the optical path lengths from the input cells to an output of the respective optical combiners, such as a point along the output waveguide where all weighted optical input signals have been combined, are configured to be equal; any differences in geometric path lengths may be compensated for by optical delay lines, e.g., placed in the input waveguides preceding the weighting cells. Further, in accordance with various embodiments, to ensure that modulated amplitudes of the weighted optical input signals directly reflect the product of inputs and weights, the optical power ratios between the input waveguides and the coupling ratios along the input and output waveguides are collectively configured such that, for passively operated (non-modulating) input and weighting cells, the signals received from all optical paths would be power-balanced at the point where they are combined. Beneficially, the weighted summation over the optical input signals along each of the columns is separate and independent from all other columns, such that the associated computational error is fixed and independent of the number of columns (e.g., corresponding to the number of neurons), allowing the architecture to be scaled without loss in precision.

In using coherent electric field addition to perform the algebraic summation over the inputs, the disclosed photonic circuit architectures obviate the need for multiple wavelengths to carry different signals, affording scalability that cannot be practically achieved with existing WDM schemes. The disclosed photonic circuitry is, however, compatible with WDM schemes and may, optionally, process light at different wavelengths in parallel, using a single crossbar array of weighting cells and associated input cells, to effectively increase the physical density of the computational units (and thus, e.g., the physical neuron density in neural network applications). For this purpose, the input cells and/or the weighting cells may include pairs of a demultiplexer and a multiplexer bracketing multiple amplitude modulators and/or phase shifters to enable imparting different inputs and/or different weights onto the different wavelength components.

In neuromorphic applications, various specific neural network types or models can be implemented by modulating multiplexed and/or demultiplexed signals in suitable combinations. For example, weight sharing as used in convolutional neural networks can be achieved by imparting, in the neural input cells, multiple different neuron inputs onto demultiplexed optical carrier signals at different wavelengths, but applying, in each of the neural weighting cells, a single weight to the multiplexed signal. For a fully connected neural network, on the other hand, a single neuron input is applied in each neural input cell onto an incoming multiplexed optical carrier signal, and each neural weighting cell imparts multiple different neuron weights onto demultiplexed optical input signals for the different wavelength components; a single column of neural-weighting cells implements, in this case, a separate neuron for each wavelength. When both the neural input cells and the neural weighting cells operate on demultiplexed optical signals at different wavelengths, each column of the crossbar matrix implements multiple independent parallel neurons equal in number to the number of wavelengths.

In some embodiments, the (e.g., neural) input and weighting cells each include two optical paths: one to impart inputs or weights onto a single, potentially multiplexed optical signal, and one that further branches into multiple optical signals at different wavelengths that can be individually modulated. Optical switches (e.g., electro-optic or thermo-optic switches) preceding and following the (neural) input and weighting cells are, in these embodiments, configurable to direct the incoming optical signal in each cell along either path. This configurability allows the photonic neural network to be programmed for any of the above-mentioned neural network types. In other words, a single hardware photonic circuit can, via the optical switch settings, efficiently implement different types of neural networks.

To form a functioning computing system, the photonic circuitry is used in conjunction with electronic circuitry that provides the control signals for drivers associated with optical amplitude modulators and phase shifters of the input cells and/or the weighting cells, and that processes the photodetector outputs. In artificial neural network applications, for instance, the photodetector outputs, which correspond to the neuron outputs of a neural network layer, may be processed to compute the neuron inputs for the next layer in the neural network. In some embodiments, such next layer is implemented as a separate physical array of neural weighting cells and associated neural input cells. In other embodiments, multiple layers of the neural network are implemented successively in multiple computational cycles using a single physical array of neural weighting cells and associated neural input cells by applying, during each cycle, the neuron inputs and neuron weights of the respective network layer, as may be stored in memory of the electronic circuitry, to the optical amplitude modulators and phase shifters. The electronic circuitry may also provide neural network functions (e.g., implementing non-linear activation layers, pooling layers, etc.) and perform pre-processing and post-processing operations on the input to and output generated by the neural network. In general, the electronic circuitry may be analog circuitry, or mixed-signal (analog-digital) circuitry including analog-to-digital and digital-to-analog converters (ADCs and DACs) to convert between the analog and digital domains. One benefit of digital circuitry is its ability to support mixed-precision operations.

The described computing platform allows implementing some functionality alternatively in the photonic or the electronic circuitry. For example, in neuromorphic applications, the electronic circuitry may include memory to store the neuron weights. Alternatively or additionally, if the neuron weights for an array of neural weighting cells do not change, or change at a frequency lower than the frequency at which the inputs change, they may be stored directly in the neural weighting cells, e.g., in optical phase-change memory. Further, non-linear activations may be applied to the linear neuron outputs by all-optical activation units preceding the photodetectors, or upon conversion of the optical output signals into the electronic domain, by analog or digital electronic circuitry; alternatively, the electro-optic non-linearity of the photodetectors themselves may serve as the non-linear activation. The electronic circuitry may also, in some embodiments, implement one or more neural network layers. For example, a convolutional neural network may be implemented with photonic convolutional layers and digital electronic pooling and fully connected layers. Moreover, while successive photonic neural network layers can interface via electronic circuitry that, as mentioned above, provides neuron inputs electronically to the neural input cells of one layer based on the neuron outputs measured at the photodetectors of the preceding layer, it is also possible to provide the optical output signals of one layer directly to the input waveguides of the next layer (omitting, in this case, the neural input cells, or operating them passively).

The foregoing will be more readily understood from the following detailed description of the accompanying drawings.

FIG. 1 is a diagram that conceptually illustrates an example artificial neuron 100, corresponding to an individual node of an artificial neural network. The artificial neuron 100 generally takes multiple inputs $x_i$ 102 (i=1 . . . N, with N being the neuron "fan-in"), and processes them in typically two stages—a linear neuron stage 104 followed by a non-linear activation stage 106—to generate a (single) neuron output 108. The linear neuron stage 104 functions like a linear algebraic unit, multiplying each input $x_i$ by a respective neuron weight $w_1$ 110, and summing, at 112, over the weighted inputs to produce the linear neuron output 114. The weights 110 may be positive or negative, effectively allowing for both addition and subtraction of the inputs 102 via the signs of the weights 110. In the non-linear activation stage 106, a non-linear function is applied to the linear neuron output 114 to produce the overall neuron output 108. Examples of such non-linear activation functions include, without limitation, logistic functions (sigmoid), trigonometric functions (sinusoid, hyperbolic tangent, etc.), rectified linear units (ReLU), inverse square root linear units (ISRU), exponential linear units (ELU), etc.

Figure 2:
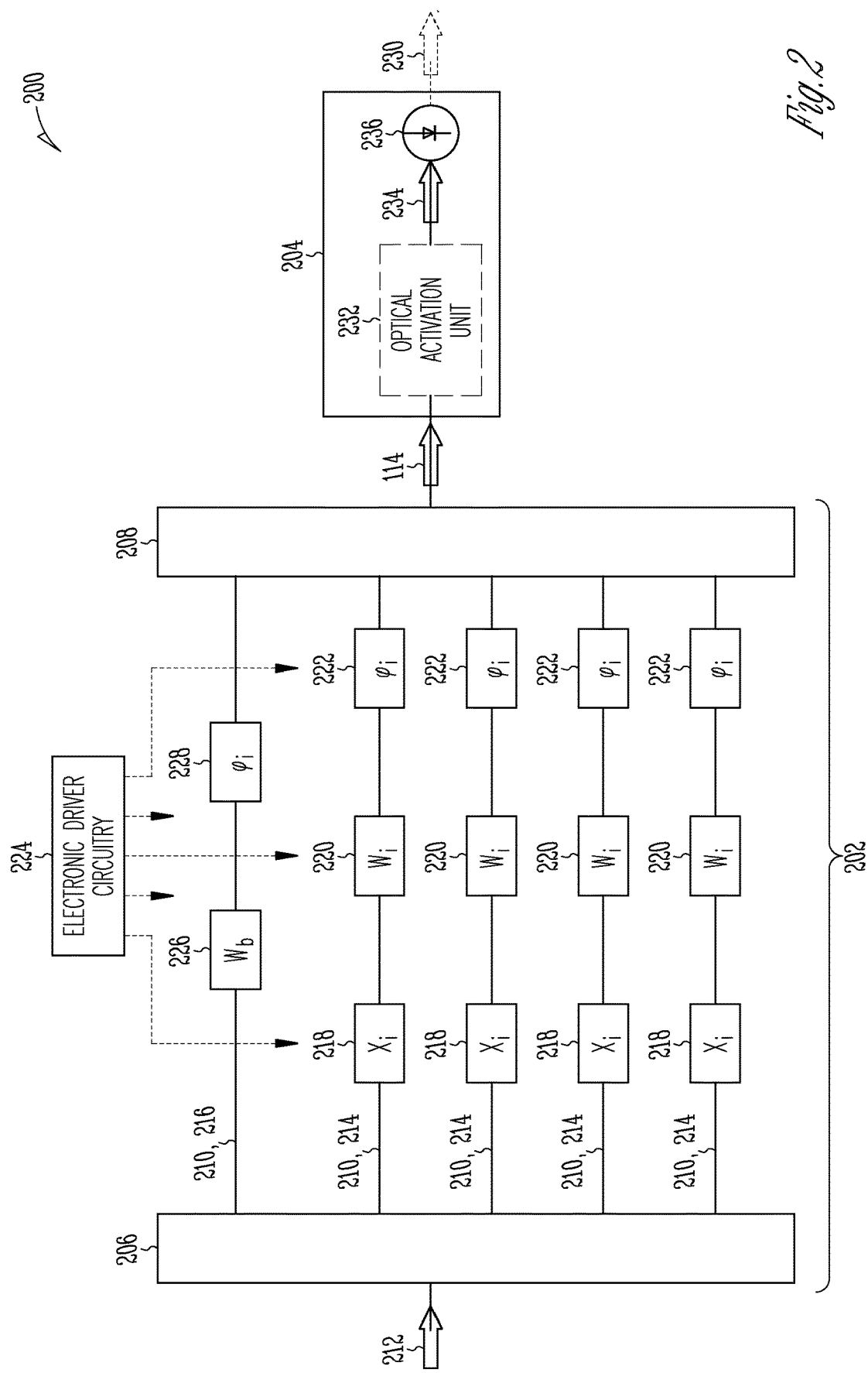
FIG. 2 is a schematic diagram of an example photonic circuit implementing an individual artificial neuron, in accordance with various embodiments.

FIG. 2 is a schematic diagram of an example photonic circuit 200 implementing an individual artificial neuron 100, in accordance with various embodiments. The photonic circuit 200, hereinafter simply referred to as a "photonic neuron," includes a coherent linear neuron stage 202 and a non-linear activation and conversion unit 204. The coherent linear neuron stage 202 (hereinafter also simply "coherent linear neuron") is implemented by a multipath interferometer formed by an optical splitter 206, an optical combiner 208, and a plurality of parallel optical interferometer branches 210 between the optical splitter 206 and the optical combiner 208. In operation, the splitter 206 splits incoming carrier light 212 between the parallel interferometer branches 210 into a plurality of optical carrier signals, which are then phase- and amplitude-modulated in the respective interferometer branches 210. The resulting modulated optical signals output by the interferometer branches 210 interfere in an optical combiner 208 to create a single optical output signal, corresponding to the coherent sum of the electric fields of the modulated optical carrier signals, that constitutes the linear neuron output 114. The interferometer branches 210 include one "neuron input branch" 214 for each neuron input $x_i$ 102 (i=1 . . . N), and optionally a "bias branch" 216 to facilitate encoding the coherent sum over the neuron input branches 214 in the intensity of the optical output signal, as explained further below. In various embodiments, the optical splitter 206 is configured to send half of the incoming light into the bias branch 216, and split the other half of the light between the neuron input branches 214. However, other split ratios between the bias branch 216 and the entirety of the neuron input branches 214 are also possible.

Each of the neuron input branches 214 may include two amplitude modulators 218, 220 and at least one phase shifter 222. In operation, electronic driver circuitry 224 associated with the amplitude modulators 218, 220 and phase shifters 222 controls the first optical amplitude modulator 218 in each neuron input branch 214 to impart the absolute value of the respective neuron input $x_i$ 102 onto the optical input signal, and controls the second optical amplitude modulator 220 to impart the absolute value of the respective neuron weight $w_i$ 110 onto the optical input signal. The phase shifter 222 is controlled to encode, for real-valued neuron inputs $x_i$ 102 and weights $w_i$ 110, the product of the signs of the neuron input $x_i$ 102 and weight $w_i$ 110 by causing, e.g., a phase shift $\varphi_i = \pi$ for a negative overall sign (product of the signs) and a $\varphi_i = 0$ for a positive overall sign (the phase shifts $\varphi_i$ being relative to some reference phase common to all of the neuron input branches 214). More specifically, the electrical drive signal of the phase shifter 222 may be the voltage resulting from the addition of the neuron input sign and the weight sign voltages: the voltages encoding the sign of the neuron input may be, for example, 0 V (positive) or 1 V (negative), and the voltages encoding the sign of the weight may be 0 V (positive) or −1V (negative); adding the two voltages together will give 0 V when the neuron input and weight are either both positive or both negative, and −1 or 1 V when then neuron input and weight have different signs. Applying −1 or 1 V to the phase shifter 222 will give in both cases a π phase shift. Alternatively to using a single phase shifter 222 to impart the product of the signs of neuron input and neuron weight, it is also possible to use two phase shifters to separately encode the phase or sign of the neuron input and the phase or sign of the neuron weight. In any case, by using one or more phase shifters to encode signs of the neuron inputs and weights, the field amplitudes of the modulated optical carrier signals can effectively be added or subtracted from each other by interference in the optical combiner 208, resulting in an overall positive or overall negative field. For complex-valued neuron inputs $x_i$ 102 and weight $w_i$ 110, two phase shifters in each branch 214 can separately encode the complex phases of, or a single phase shifter in 222 in each branch 214 can encode the relative complex-phase difference between, the neuron inputs $x_i$ 102 and weight $w_i$ 110.

In various embodiments, the optical splitter 206 and the optical combiner 208 are each formed by a cascade of bifurcated optical couplers. For example, to split the incoming carrier light into $N=2^{N'}$ neuron input branches 214, the optical splitter 206 may be configured as a symmetric tree of N' layers of 3 dB couplers successively splitting the light, with the optical combiner 208 configured as a reverse symmetric tree of N' layers of 3 dB couplers successively recombining the modulated signals. This configuration ensures that the incoming light is split evenly between the neuron input branches 214 and the modulated light is recombined at equal ratios across the input branches 214. With such an even split of the incoming light 212 between $2^{N'}$ neuron input branches 214 (and assuming there is no bias branch 216), and denoting the field of the incoming carrier light 212 by $E_{in}$, the electric field amplitude $E_{out}$ of the optical interference signal at the output of the optical combiner 208 is given by:

$$E_{out} = \frac{E_{in}}{2^{N'}} \sum_{i=1}^{N} w_i x_i e^{j\varphi_i}.$$

Herein, the factor $\frac{1}{2}^{N'}$ reflects that the electric field amplitude is diminished by a factor of $1/\sqrt{2}$ at each 3 dB coupler within the optical splitter 206 and the optical combiner 208. In practice, a symmetric splitter configuration is not always geometrically achievable. In a crossbar matrix implementing multiple neurons as described below with respect to FIG. 3, for instance, the weighted optical input signals are coupled into the output waveguide one at a time, in an inherently asymmetric coupling configuration. In this case, different tree structures and coupling ratios may be used. In general, to ensure that the modulated optical input signals encoding the weighted inputs $w_i x_i$ are all weighted equally in the combined optical output signal so as to achieve the desired algebraic summation, the coupling ratios are chosen such that the factors by which the electric field amplitude is reduced at the couplers multiple up to the same product along all interferometric branches.

The phase of an optical signal such as $E_{out}$, and any sign information encoded therein, is, of course, lost when the intensity of the signal is measured. Therefore, to facilitate distinguishing between an overall positive and an overall negative coherent sum of the modulated optical output signals received from the neuron input branches 214, that coherent sum is offset, in some embodiments, by a bias signal added via the bias branch 216. The bias branch 216 may include an amplitude modulator 226 and an optional phase shifter 228, controlled by the electronic driver circuitry 224, to impart a bias weight $w_b$ and phase shift $\varphi_b$, respectively, on the electric field of the bias signal. Like the phase shifters 222 in the neuron input branches 214, the phase shifter 228 in the bias branch 216 may set the phase shift $\varphi_b$ to π for a negative bias and to zero for a positive bias relative to the optical input signals associated with the neuron inputs. (Note that the phase shifter 228 is not needed if the phase of the bias signal is used as the common reference phase relative to which the phase shifts $\varphi_i$ in the neuron input branches 214 are set.) The amplitude modulator 226 may be operated to generate an offset field large enough in amplitude to exceed the maximum expected absolute value of the coherent sum of the weighted optical input signals output by the neuron input branches 214 to ensure that the overall interference signal has a positive field amplitude. With a 1:1 split of the incoming light 212 between the neuron input branches 214 and the bias branch 216 and an even split between N neuron input branches 214, the electric field amplitude $E_{out}$ of the optical interference signal at the output of the optical combiner 208 is given by:

$$E_{out} = \frac{1}{\sqrt{2}} E_{in} \left[ w_b e^{j\varphi_b} + \frac{1}{2^{N'}} \sum_{i=1}^{N} w_i x_i e^{j\varphi_i} \right].$$

As can be seen, if the bias term and the neuron-input term are phase-aligned and the weights $w_1$ and inputs $x_i$ are all no greater than 1 (as is the case if the amplitude modulators all attenuate the signal or just operate transparently rather than amplifying it), a bias weight $w_b$ equal to 1—trivially implemented by a bias branch 216 without an amplitude modulator 226—would ensure that the bias term exceeds or is equal to the absolute value of the neuron input term; accordingly, in some embodiments, the bias branch 216 can be an additional interferometer arm receiving half of the input light 212, without anything further.

As shown in FIG. 2, the optical output signal of the coherent linear neuron 202 (which reflects the linear neuron output 114) may be provided to the non-linear activation and conversion unit 204, which applies an activation function and generates an electronic neuron output signal 230. In some embodiments, an optical non-linear activation unit 232 implements an activation function all-optically in that it produces an optical neuron output signal encoding the output value of the activation function. All-optical activation units are known to those of ordinary skill in the art. In one example, an optical activation unit is constructed from a semiconductor optical amplifier Mach-Zehnder interferometer (SOA-MZI) operating in its deeply saturated regime and configured in a differentially biased scheme, followed by an SOA that operates in its small-signal gain region, with both devices performing as wavelength converters; details of this optical activation unit are described in G. Mourgias-Alexandris et al., "An all-optical neuron with sigmoid activation function," Optics Express, Vol. 27, No. 7 (April 2019). The optical neuron output signal 234 exiting the optical non-linear activation unit can then be converted, e.g., by measurement of the intensity with a photodetector 236, into the electronic neuron output signal 230. Alternatively, the photodetector 236 itself may serve to implement the non-linear activation function, opto-electronically converting the amplitude $|E_{out}|$ of the optical interference signal into an electronic signal proportional to the square of the amplitude. The non-linear activation and conversion unit 204 may also include circuitry (not shown) following the photodetector 236 that applies an activation function electronically after conversion of the optical linear neuron output 114 into the electrical domain. Thus, in general, the electro-optic non-linearity inherently applied by the photodetector 236 may by itself constitute the non-linear activation, or may be combined with a preceding all-optical or an electronic non-linearity to implement an overall non-linear activation function.

In various embodiments, the photonic neuron 200 is implemented in a PIC (although bulk-optic implementations are, in principle, also possible), e.g., on a silicon-on-insulator (SOI) substrate. Beneficially, PIC implementations provide a small form factor, allowing for controllability and high complexity of the circuits, and can be manufactured using existing semiconductor foundries, which translates into high-volume manufacturing and low cost. In a photonic neuron PIC, integrated optical waveguides (e.g., rectangular ridge or rib waveguides formed in the silicon device layer of the substrate) deliver the carrier light 212 to the photonic neuron 200, implement the interferometer branches 214, 216, and guide the optical interference signal from the linear neuron stage 202 to the optical non-linear activation unit 232 (if any) and/or the photodetector 236. The optical splitter 206 and the optical combiner 208 may be implemented by cascades of waveguide-based power dividers or directional couplers, such as Y-junction couplers or multimode interferometer (MMI) couplers. The photodetector 236 may be, e.g., an integrated waveguide-based p-i-n diode.

The phase shifters 222, 228 may include electro-optic and/or thermal phase shifters that modulate the refractive index within the waveguide-based interferometer branches 214, 216 by application of an electrical voltage or heat, respectively. In the case of a thermal phase shifter, heat is usually applied by one or more Ohmic heating filaments; thus, thermal phase shifters, like electro-optic phase shifters, can be controlled via electronic signals. The amplitude modulators 218, 220, 226 may likewise be implemented by electro-optic or thermo-optic components, such as, e.g., electro-absorption modulators (EAMs) (e.g., germanium silicon EAMs) optical resonant modulators (e.g. optical ring modulators), or Quantum-Confined Stark Effect (QCSE) EAMs. Since EAMs affect the refractive index as well as the absorption properties of the waveguide, it is also possible to implement phase shifters with EAMs, e.g., three EAMs in series to impart the desired phase shift while mutually canceling out incidental amplitude modulations caused by each individual EAM.

In various embodiments, the function of the amplitude modulators (and/or phase shifters), in particular those for imparting the weights, is provided by non-volatile optical memory implemented by optical phase-change materials (O-PCMs). O-PCMs, such as various chalcogenide alloys (e.g., germanium-antimony-tellurium (GST) alloys), can undergo gradual changes between their crystalline and amorphous phases, and can be set, by controlled application of heat, to any physical phase along a continuum of phases between crystalline and amorphous. The different physical phases have different associated electrical and/or optical properties. Thus, O-PCMs, e.g., when disposed as thin films on top of a waveguide, can effect a change in the optical properties, such as refractive index and absorption, of the waveguide itself (e.g., by virtue of the overlap of the evanescent field of any guided mode with the O-PCM film). Beneficially, O-PCM-based optical memory is non-volatile, yet rewritable. Using O-PCMs, fixed optical amplitude modulations and/or fixed phase shifts can be stored directly in the PIC, without any need for electronic drive signals.

Having described the principles of coherent computing for a single weighted summation over a set of inputs with reference to the example of an individual photonic neuron 200, the discussion now turns to photonic architectures that simultaneously compute multiple weighted sums over the same set of inputs for multiple respective sets of weights (corresponding to the multiplication of an input vector with a weight matrix), e.g., to integrate multiple coherent linear photonic neurons into a neural network layer.

Figure 3:
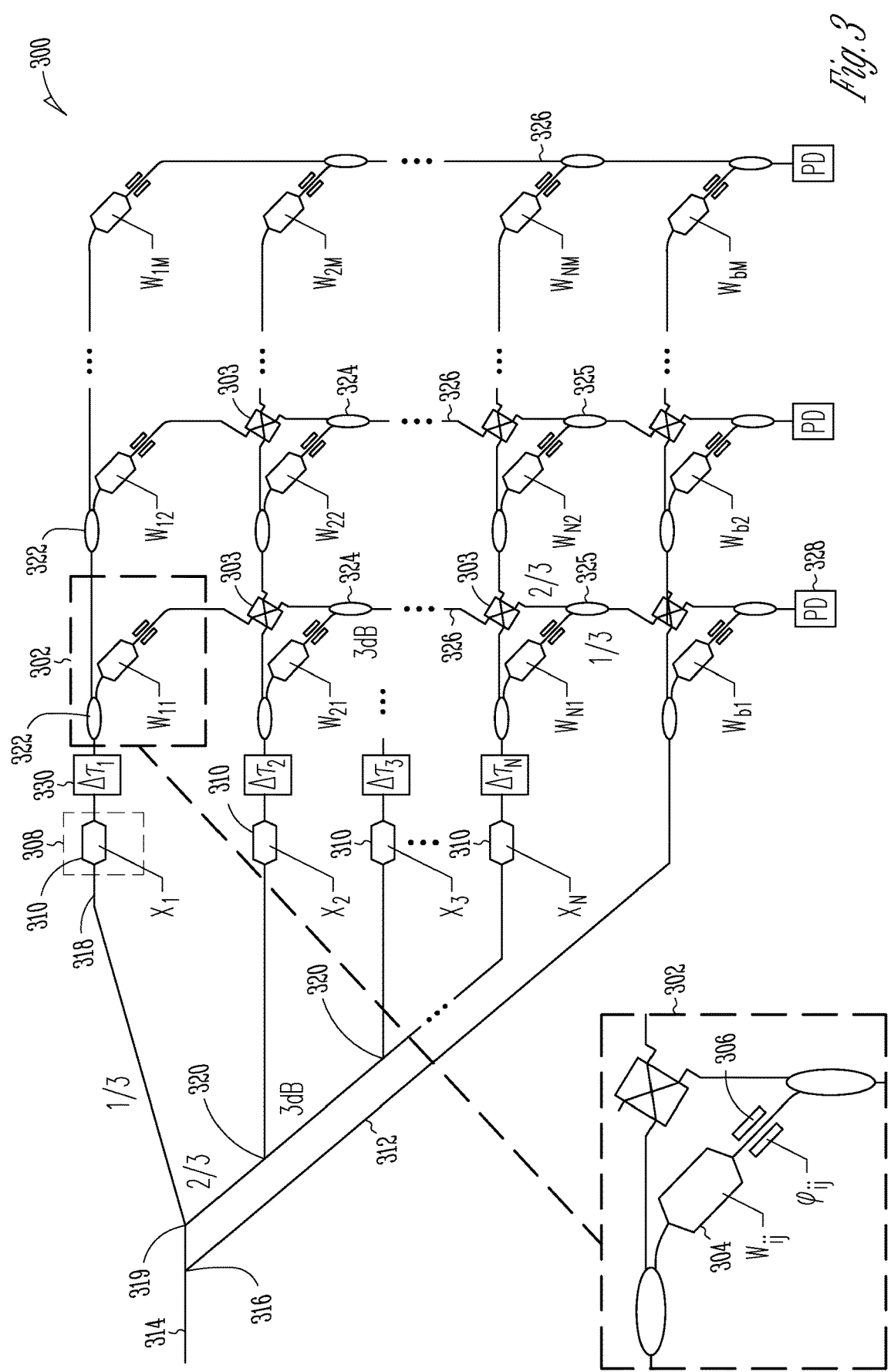
FIG. 3 is a schematic diagram of an example photonic crossbar suitable for implementing a neural network layer, in accordance with various embodiments.

FIG. 3 is a schematic diagram of an example photonic crossbar 300, e.g., implementing a neural network layer, in accordance with various embodiments. The photonic crossbar 300 includes an array of neural weighting cells 302, each coupled between one of a plurality of first waveguides arranged along the rows of the array and one of a plurality of second waveguides arranged along the columns of the array, crossing the first waveguides at waveguide crossings 303 (or 2×2 switches operating in crossing mode). Each column of weighting cells 302 constitutes a separate set of weighting cells (e.g., corresponding to a separate neuron within the neural network layer) for computing a separate output, and each row of weighting cells 302 is associated either with one of the (e.g., neuron) inputs $x_i$ or with a bias, or biases, applied at the columns. The weighting cells 302 each include an amplitude modulator 304 and a phase shifter 306 (corresponding to the amplitude modulator 220, 226 and phase shifter 222, 228 along any one of the interferometer branches 210 of the photonic neuron 200 shown in FIG. 2), which serve to apply signed weights $w_{ij}$ onto optical input signals or bias weights $w_{bj}$ onto an optical carrier signal for the bias, where i=1 N numbers the inputs (with N being, e.g., the fan-in of a neuron) and j=1 M numbers the sets of weights, e.g., representing the neurons in the layer.

The rows of weighting cells 302 associated with the different inputs receive their optical input signals from respective input cells 308. Each input cell 308 includes (or, in the depicted example, consists of) an amplitude modulator 310 (corresponding to the amplitude modulator 218 along one interferometer branch in FIG. 2), which serves to apply the input $x_i$ to create a respective first modulated optical signals. The input cells 308 and the bias branch 312 of the photonic crossbar 300 receive carrier light from a single incoming optical waveguide 314, which branches into the plurality of first waveguides along the rows of the matrix, first splitting off a bias branch 312 at optical splitter 316, and then successively branching into a plurality of input waveguides 318 associated with the neural input cells 308 in a cascade of bifurcating waveguide splitters 319, 320 (e.g., implemented as Y-junctions, as shown). Collectively, the waveguide sections coupling the incoming optical waveguide 314 to the input cells 308, along with the waveguide splitters 316, 319, 320 along the way, form the optical splitter (which corresponds in function to splitter 206 of the photonic neuron 200 of FIG. 2).

Each weighting cell 302 in any except the last column has, at its input, an optical coupler 322 that functions as an optical tap, coupling a fraction of the optical power guided in the input waveguide 318 or bias branch 312 associated with the weighting cell 302 into that weighting cell 302, and passing the remainder of the optical power on to the weighting cells 302 associated with downstream columns of the crossbar 300. The weighting cells 302 in the last column simply receive the optical power remaining in the input waveguide 318 downstream of the optical taps associated with the second-to-last column. Along each of the input waveguides 318 and the bias branch 312 (collectively the first waveguides), the fraction of the optical power that is tapped into the weighting cells 302 may increase in a direction of propagation of the optical input signal, such that the optical input signals received by the weighting cells 302 in each row are all substantially equal in power. Such power balancing between the columns of the crossbar 300 serves to achieve uniform signal-to-noise ratios and associated photonic computational precision across the different sets of weights (e.g., corresponding to different neurons) implemented by the columns and ensures that the signal levels of the optical output signals reflect the computational output values consistently across the columns.

Each weighting cell 302 in any except the first row further has, at its output, an optical coupler 324 or 325 (e.g., structurally similar to the couplers 322, but operated in the reverse direction as a combiner) that couples the weighted optical input signal (or the bias signal) generated by the weighting cell 302 (or second modulated optical signal) into one of the plurality of second waveguides (or output waveguides) 326 associated with the columns of the crossbar 300, thereby combining the output of that weighting cell 302 with the combined outputs of any weighting cells 302 upstream along the respective output waveguide 326. In other words, the second modulated optical signals are combined sequentially along the output waveguide 326. The outputs of the weighting cells 302 of the first row constitute the beginning of the output waveguides 326. Collectively, the output waveguide 326 and optical couplers 324, 325 along each column form the optical combiner associated with the set of weights (or neuron) implemented by the column (which corresponds in function to output combiner 208 of a single photonic neuron 200 as shown in FIG. 2). Note that the optical input signals imparted on carrier signals that are split off first in the cascade of waveguide splitters 319, 320 are also recombined first along the output waveguides 326 in this embodiment. After combination of the second modulated optical signals representing weighted inputs, the coherent sum is combined with the bias signal in bias branch 312. The resulting optical output of the output waveguide 326, which encodes the computational output (e.g., of a linear neuron), can then be measured with a photodetector 328.

The input cells 308 may be operated cyclically, imparting during each computational cycle a new set of inputs onto the generally continuous-wave optical carrier signals in the input waveguides 318. The optical input signals, accordingly, take the form of pulses flowing through the photonic crossbar 300. To ensure that the pulses of each cycle interfere along each column, the photonic crossbar 300 is configured such that the optical path lengths from all input cells to the optical coupler 325 associated with the output of the N-th neural weighting cell 302 in the column are equal. Since the geometric path lengths, as can be seen in FIG. 3, may generally differ as a consequence of the array arrangement of the weighting cells 302, the crossbar 300 may include optical delay lines 330, e.g., in the input waveguides 318 between the outputs of the input cells 308 and the optical couplers 322 associated with the first column of weighting cells 302. The delay lines 330 delay the input signal pulses by time delay intervals $\Delta\tau_1 < \Delta\tau_2 < \ldots < \Delta\tau_N$ chosen such that all pulses arrive at the same time at the coupler 324, 325 that recombines them. The optical delay line 330 may further include a tunable phase shifter that is calibrated to ensure that the signal pulses are all phase-aligned (up to phase differences reflecting the imparted weights) at the point of recombination and interference. Alternatively, the phase shifters 306 in the neural weighting cells 302 may be operated to compensate for any phase differences between the optical paths to the point of recombination, in addition to imparting the sign of the weight via zero or $\pi$ phase shifts.

Furthermore, the waveguide splitters 319, 320 of the input splitter and the optical couplers 324 along the output waveguides 326 (of the optical combiners) are collectively configured to ensure that the second modulated optical signals output by the weighting cells 302 are all weighted equally in the coherently combined optical output signal, such that the amplitude of the output signal accurately reflects the sum of the imparted weighted inputs. For this purpose, the coupling ratios of the waveguide splitters 319, 320 and optical couplers 324 are chosen such that optical signals along each path from and including the splitter 319 (where the input waveguides 318 start branching off) through the coupler 325 in the N-th row of any given column experience the same product of amplitude reductions. For example, in one embodiment, the waveguide splitter 319 couples one third of the optical power into the input waveguide 318 associated with the first row. The remaining two thirds of the optical power go into a branch along which a series of 3 dB waveguide splitters 320 each split the incoming optical power in half. In each output waveguide 326, the couplers 324 in the second to (N−1)-th row that combine the first N−1 weighted input signals are 3 dB couplers, and the coupler 325 in the N-th row combines the output of its associated neural weighting cell 302 with the input from the output waveguide 326 in a 1:2 coupling ratio. Due to these coupling ratios, the electric field amplitude of the optical signal traveling along the first path is multiplied by a factor of $1/\sqrt{3}$ at the splitter 319, by a factor of $1/\sqrt{2}$ at each of the N−2 couplers 324 along the output waveguide 326 in the second to (N−1)-th row, and by a factor of $\sqrt{2/3}$ at the coupler 325 in the N-th row. Similarly, and amounting to the same product, the electric field amplitude of the optical signals traveling along each of the second to N-th paths is multiplied by a factor of $\sqrt{2/3}$ at the splitter 319, by a factor of $1/\sqrt{2}$ at each of a total of N−2 splitters/couplers 320, 324 encountered in the input coupler and along the output waveguide 326, and by a factor of $1/\sqrt{3}$ at the coupler 325 in the N-th row. The coupling ratios of the splitter 316 that creates the bias branch 312 may be set taking into account overall losses along the optical paths as well as the sensitivity of the photodetectors 328.

The foregoing description of the photonic crossbar 300 of FIG. 3 provides one possible layout and configuration of the input and weighting cells along with the optical splitter and optical combiners in a photonic circuit implementing linear computations, e.g., for a neural network layer. Other geometric layouts and physical configurations, with or without arrangement of the weighting cells in an array, that still achieve the simultaneous weighted summations, with multiple sets of weights, over a set of inputs are conceivable.

The photonic crossbar 300 shown in FIG. 3 illustrates the fundamental structure, in accordance with one embodiment, of a computational layer implementing multiple separate sets of weights, e.g., as representing a neural network layer formed from multiple single-wavelength coherent linear neurons 200. The following description of FIGS. 4-7 will show how this fundamental structure can be augmented to implement WDM schemes that enable a greater number of optical computations with the same number of weighting cells 302 by performing computations in parallel at multiple wavelengths. These WDM schemes are particular suited for (but not limited to) neural network implementations, where they, in effect, increase the neuron density while allowing for different neural network model configurations over the same underlying photonic hardware.

Figure 4:
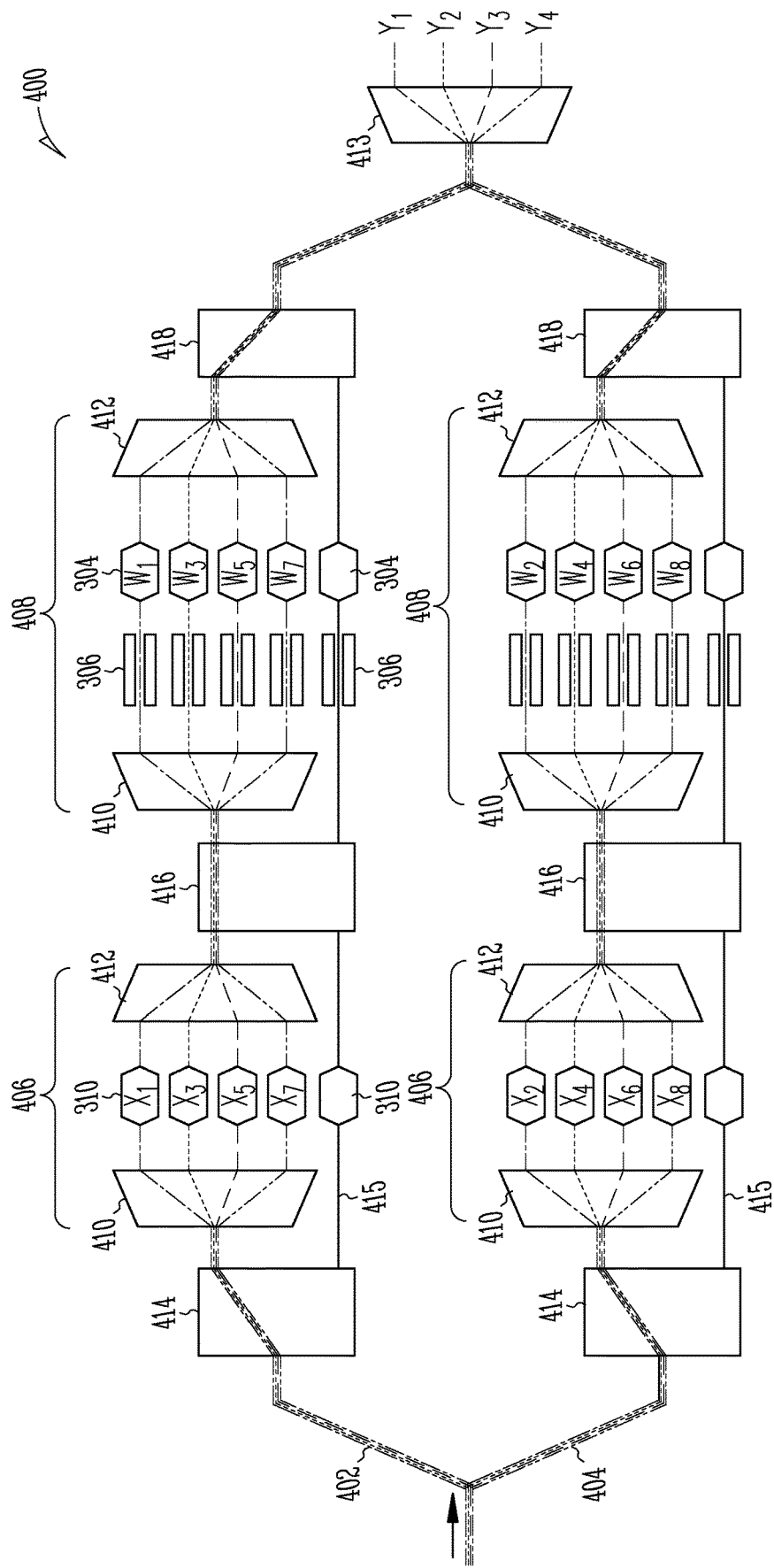
FIG. 4 is a schematic diagram of an example WDM photonic circuit configuration suitable for implementing multiple independent artificial neurons, in accordance with one embodiment.

FIG. 4 is a schematic diagram of an example WDM photonic circuit configuration 400 suitable for implementing multiple independent artificial neurons, in accordance with one embodiment. For simplicity, the photonic circuit configuration 400 is shown with only two interferometer branches 402, 404, each including a (neural) input cell 406 and a (neural) weighting cell 408. As will be readily apparent to those of ordinary skill in the art, additional, analogous interferometer branches can straightforwardly be added to achieve weighted summation over more than two inputs.

To facilitate WDM operation on multiplexed optical input signals in the branches 402, 404, each of the input cells 402 and the weighting cells 408 includes a demultiplexer 410 that divides the multiplexed signals into their constituent (e.g., as shown, four) wavelength components, and a multiplexer 412 that recombines those components into a multiplexed signal at the output of the input cell 406 or weighting cell 408. In the input cells 406, the demultiplexer 410 and multiplexer bracket multiple amplitude modulators 310, one for each of the wavelengths, to impart respective inputs onto the different wavelength components of the optical carrier signal. Similarly, in the weighting cells 408, the demultiplexer 410 and multiplexer 412 bracket amplitude modulators 304 and phase shifters 306 associated with the different wavelengths that allow imparting different respective weights. The multiplexed modulated optical signals at the outputs of the two interferometer branches 402, 404 are brought to interfere at the output combiner 208 (e.g., implemented, as shown, by a Y-junction), and are then again divided up by wavelength with an output demultiplexer 413 to produce separate optical output signals (e.g., four output signals $y_1$, $y_2$, $y_3$, $y_4$) for the (e.g., four) different wavelengths. This WDM configuration can implement, in a single column of neural weighting cells, four independent dual-input neurons operating on generally different input signals, as reflected in the sparse weight matrix in the following matrix equation representing the depicted neural network operation:

$$\begin{bmatrix} y_1 \\ y_2 \\ y_3 \\ y_4 \end{bmatrix} = \begin{bmatrix} w_1 & w_2 & 0 & 0 & 0 & 0 & 0 & 0 \\ 0 & 0 & w_3 & w_4 & 0 & 0 & 0 & 0 \\ 0 & 0 & 0 & 0 & w_5 & w_6 & 0 & 0 \\ 0 & 0 & 0 & 0 & 0 & 0 & w_7 & w_8 \end{bmatrix} \begin{bmatrix} x_1 \\ x_2 \\ x_3 \\ x_4 \\ x_5 \\ x_6 \\ x_7 \\ x_8 \end{bmatrix}$$

Note that, in a variation, the demultiplexer 413 could be followed by a second layer of (four) separate weights for the different wavelengths, a multiplexer, and a photodetector that measures the combined intensity of the multiplexed signals at the output. In this case, the photonic structure would implement two cascaded neurons, with the first neuron layer providing a square activation (by virtue of the photodetector, which measures the intensity rather than the electric field).

Optionally, as shown in FIG. 4, the input cells 406 and the weighting cells 408 may each include an alternative optical path 415 along which all wavelength components of the multiplexed optical carrier signal are processed jointly with a single amplitude modulator 310 in the input cell 406 and a single pair of amplitude modulator 304 and phase shifter 306 in the weighting cell 408. Thus, each input cell 406 includes a first, demultiplexed input optical path and a second, multiplexed input optical path, and each weighting cell 408 includes a first, demultiplexed weighting optical path and a second, multiplexed weighting optical path. To enable directing the optical carrier signal in each interferometer branch 402, 404 selectively along the first or second input optical path and the first or second weighting optical path in any combination, the photonic circuit configuration 400 includes electro-optic switches 414, 416, 418 placed in the interferometer branches 402, 404 preceding the input cells 406, between the input and weighting cells 406, 408, and following the weighting cells 408. In the depicted configuration 400, the switch settings are such that the optical input signal travels along the first, demultiplexed input and weighting optical paths. The same configuration can be achieved in a fixed manner by omitting the switches 414, 416, 418 as well as the multiplexed paths in the input and weighting cells 406, 408.

Figure 5:
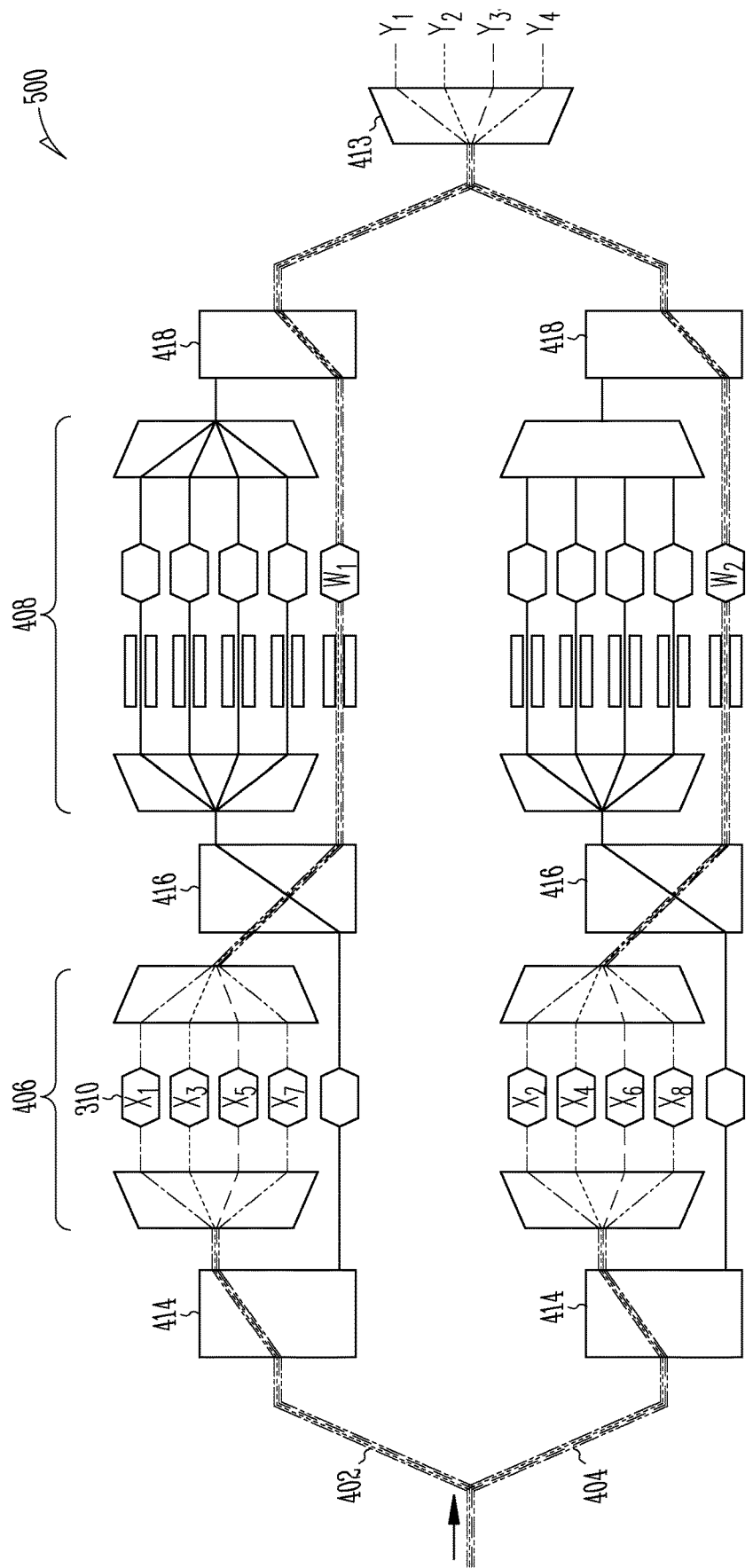
FIG. 5 is a schematic diagram of an example WDM photonic circuit configuration suitable for implementing a convolutional neural network layer, in accordance with one embodiment.

FIG. 5 is a schematic diagram of an example WDM photonic circuit configuration 500 suitable for implementing a convolutional neural network layer, in accordance with one embodiment. This configuration 500 utilizes the same hardware components as are described above with reference to FIG. 4, but a different setting of the electro-optic switches 416, 418. Like in configuration 400, the optical carrier signals are demultiplexed in the input cells 406, and different inputs are imparted on the various wavelength components. However, unlike in configuration 400, the recombined wavelength components exiting the neural input cells 406 are then switched, via the electro-optic switches 416, from the output of the demultiplexed input optical path to the input of the multiplexed weighting optical path, such that, within each of the interferometer branches 402, 404, all wavelength components receive the same weights. This sharing of weights across multiple inputs is characteristic of convolutional neural networks, where the same kernel (set of neuron weights) is applied to different receptive fields (sub-sets of neuron inputs) within the set of neuron inputs, such as, e.g., to different sub-regions of an image. In the WDM photonic circuit configuration 500, applied to convolutional neural networks, different wavelengths serve to apply the kernel to different receptive fields.

With the specific inputs and weights shown in FIG. 5, the photonic circuit configuration 500 implements four neurons of a convolutional neural network layer with a kernel size of 2 (meaning that each neuron takes two neuron inputs) and a stride of 2 (meaning that the kernels shift by two neuron inputs between adjacent neurons), operating on an eight-dimensional input. In matrix notation, the operation of this convolutional neural network layer can be written as:

$$\begin{bmatrix} y_1 \\ y_2 \\ y_3 \\ y_4 \end{bmatrix} = \begin{bmatrix} w_1 & w_2 & 0 & 0 & 0 & 0 & 0 & 0 \\ 0 & 0 & w_1 & w_2 & 0 & 0 & 0 & 0 \\ 0 & 0 & 0 & 0 & w_1 & w_2 & 0 & 0 \\ 0 & 0 & 0 & 0 & 0 & 0 & w_1 & w_2 \end{bmatrix} \begin{bmatrix} x_1 \\ x_2 \\ x_3 \\ x_4 \\ x_5 \\ x_6 \\ x_7 \\ x_8 \end{bmatrix}$$

Different convolutional neural network layers can be implemented by adjusting the neuron inputs applied by the amplitude modulators 310 in the neuron input cells 406, the number of interferometer branches or rows in a photonic crossbar implementation, the number of columns in a photonic crossbar, and the number of wavelengths in the multiplexed signals. To achieve overlapping receptive fields, for instance, the neuron inputs applied in the neuron input cells 406 will overlap between the interferometer branches or rows. Further, added wavelengths and/or added crossbar columns can provide an increased number of neurons in the neural network layer to accommodate a larger fan-in or smaller stride.

Figure 6:
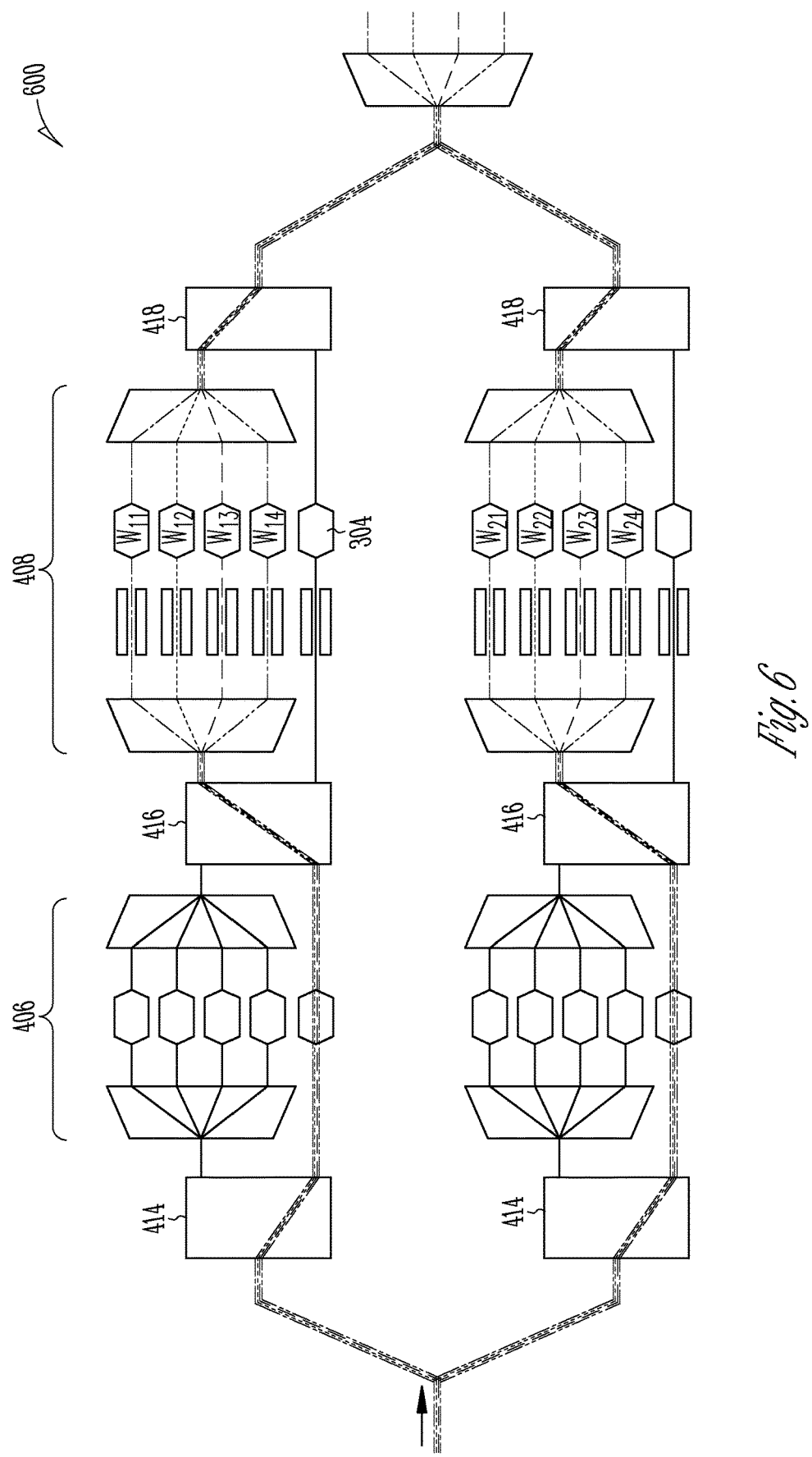
FIG. 6 is a schematic diagram of an example WDM photonic circuit configuration suitable for implementing a fully connected neural network layer, in accordance with one embodiment.

FIG. 6 is a schematic diagram of an example WDM photonic circuit configuration 600 suitable for implementing a fully connected neural network layer, in accordance with one embodiment. In this configuration 600, which again employs the same hardware as configurations 400, 500, the electro-optic switches 414, 416, 418 are set such that, in each interferometer branch, a single input is applied to the multiplexed optical input signal in the multiplexed input optical path of the input cell 406, and separate weights are applied to different wavelength components in the demultiplexed weighting optical path of the weighting cell 408. As a result, the configuration 600 can simultaneously implement four dual-input neurons operating on two-dimensional input, as can be represented by the fully connected neural network layer matrix:

$$\begin{bmatrix} y_1 \\ y_2 \\ y_3 \\ y_4 \end{bmatrix} = \begin{bmatrix} w_{11} & w_{21} \\ w_{12} & w_{22} \\ w_{13} & w_{23} \\ w_{14} & w_{24} \end{bmatrix} \begin{bmatrix} x_1 \\ x_2 \end{bmatrix}.$$

Figure 7:
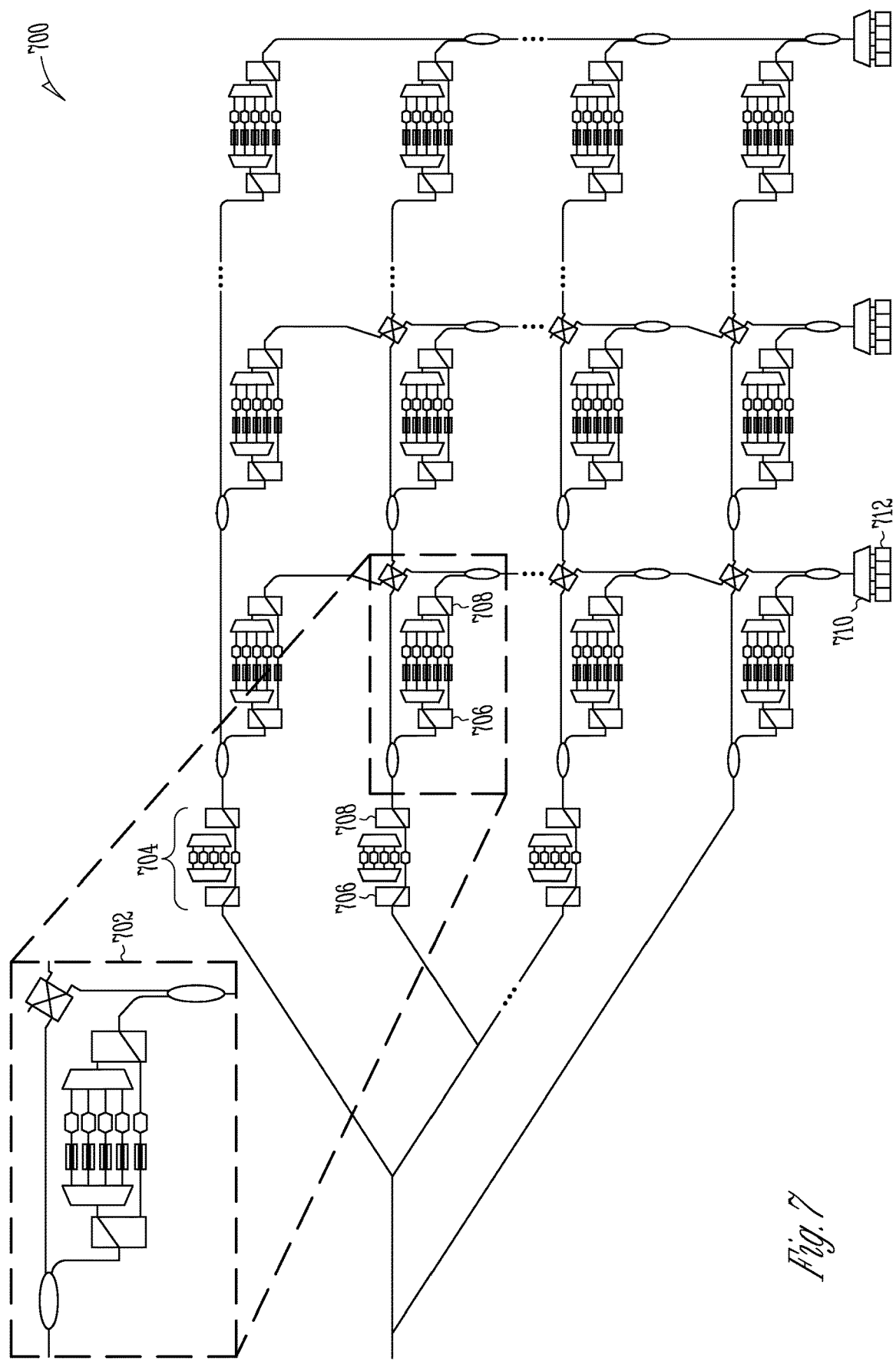
FIG. 7 is a schematic diagram of an example WDM, switch-configurable photonic crossbar suitable for implementing a programmable neural network layer, in accordance with various embodiments.

FIG. 7 is a schematic diagram of an example WDM, switch-configurable photonic crossbar 700 suitable for implementing a programmable neural network layer, in accordance with various embodiments. This WDM photonic crossbar 700 has the same large-scale structure as the single-wavelength photonic crossbar 300 shown in FIG. 3, but the single-wavelength weighting cells 302 and input cells 310 have been substituted by WDM-enabling weighting cells 702 and input cells 704 substantially similar to those shown for the WDM photonic circuit configurations 400, 500, 600. That is, each weighting cell 702 and each input cell 704 includes two optical paths, one for imparting different signed weights or inputs onto different wavelength components of a demultiplexed optical carrier signal by respective amplitude modulators and/or phase shifters bracketed between a demultiplexer and a multiplexer, and one for imparting a single signed weight or input onto a multiplexed signal. Electro-optic switches 706, 708 at the inputs and outputs of the weighting cells 702 and input cells 704 enable selectively coupling light into one or the other path. Note that, in the depicted crossbar configuration, the single 2×2 switch between the output of an input cell and the input of a weighting cell is replaced by two separate (1×2 and 2×1) switches 706, 708. To measure the different wavelength components of the optical output signals for each column, the WDM photonic crossbar 700 includes, at the output of each of the output waveguides, a demultiplexer 710 followed by an array of photodetectors 712.

As will be appreciated, the switch-configurable photonic crossbar 700 provides maximum flexibility for implementing different neural network models in a programmable manner. For fixed applications, where the neural network structure does not change, it may be preferable to use a "hardwired" custom photonic crossbar configuration. For example, to implement a convolutional neural network, a photonic crossbar may be designed with WDM neural input cells that allow imparting different neuron inputs onto different wavelength components of a multiplexed carrier signal, but with neural weighting cells each including only a single pair of amplitude modulator and phase shifter to apply a signed weight to a multiplexed optical input signal in its entirety. Apart from the added demultiplexer/multiplexer pair and the multiple paths in the input cells and the demultiplexers at the output waveguides, the complexity of such a crossbar is no greater than that of the single-wavelength photonic crossbar 300. However, the number of columns in the WDM crossbar is reduced by a factor equal to the number of wavelengths. For a given convolutional neural network, the custom WDM crossbar, thus, can provide significant savings in real estate on the chip and in cost, as compared with both the generic single-wavelength crossbar 300 and the fully programmable WDM crossbar 700.

Having described various coherent photonic circuit architectures, the integration of the photonic circuitry with electronic circuitry to, for instance, supply the drive signals for optical signal modulation and process the output signals encoding the computational outputs of the optically implemented linear computations will now be described.

Figure 8A:
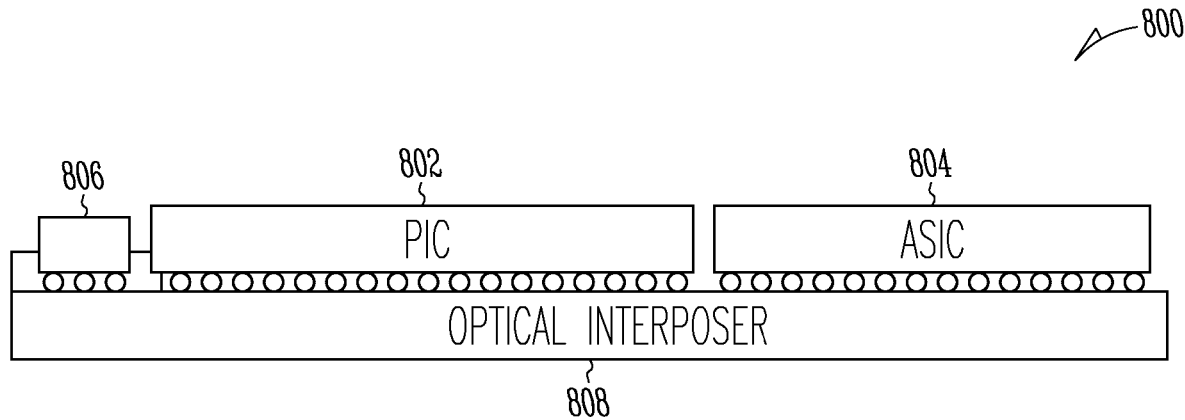
FIGS. 8A and 8B are schematic side and top views, respectively, illustrating an example hybrid photonic-electronic computing system in accordance with various embodiments.
Figure 8B:
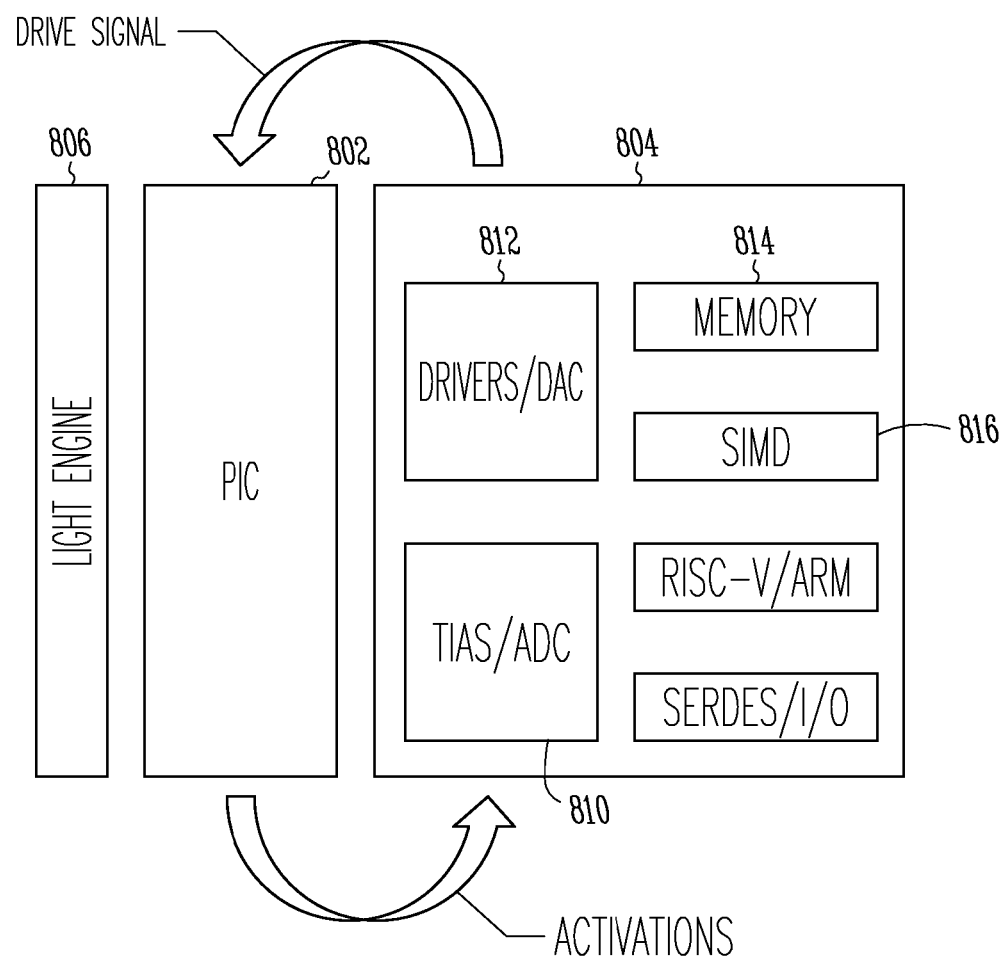

FIGS. 8A and 8B are schematic side and top views, respectively, illustrating an example hybrid photonic-electronic computing system 800 in accordance with various embodiments. As shown in FIG. 8A, the system 800 includes a PIC 802, e.g., implemented in silicon, that includes one or more photonic crossbars (e.g., 300, 700) for performing weighted summations over inputs (e.g., implementing linear neural network layers), and an electronic integrated circuit (EIC) 804 that interfaces with and complements the function of the PIC 802. The EIC 804 may include analog and/or digital circuitry, and may be hardwired and application-specific (e.g., an application-specific integrated circuit (ASIC)) or programmable (e.g., a field-programmable gate array FPGA). The system 800 further includes a light engine 806 with one or more lasers, such as, without limitation, distributed feedback (DFB) lasers or other laser diodes implemented, e.g., in III-V compound semiconductor materials, to generate coherent carrier light. Multiple lasers emitting at the same wavelength may be used to generate carrier light for multiple photonic crossbars at one or more wavelengths. Alternatively or additionally, the light engine 806 may include multiple lasers emitting at different wavelengths, as well as a wavelength multiplexer, e.g., implemented as an arrayed waveguide grating, to combine the different wavelengths into a single, multiplexed optical carrier signal.

The PIC 802, EIC 804, and light engine 806 interface with each other via an optical interposer 808, which integrates them into a chip-scale package. The interposer 808 may, for instance, include electrical connections between the photodetectors on the PIC 802 and the associated processing circuitry in the EIC 804, where the analog electronic output signals of the photodetectors are processed, as well as between the modulators (that is, amplitude modulators and phase shifters) in the PIC 802 and the associated driver circuitry in the EIC 804. Additionally, the interposer 808 may include electrical connections between the EIC 804 and the light engine 806, e.g., to allow the EIC 804 to control and monitor operation of the light engine 806. The power consumption of the electronic interface between the PIC 802 and the EIC 804 is, in some embodiments, less than 3 pJ (picojoules) per bit of data converted between the optical domain and the digital electronic domain.

The interposer 808 may further facilitate optical communication between the light engine 806 and the PIC 802 via waveguiding structures in the interposer 808 that couple the (e.g., multiplexed) laser outputs into waveguides (e.g., carrier-light waveguide 314 leading up to the optical splitter of a photonic crossbar) in the PIC 806. Coupling may be achieved, e.g., using an edge coupler, an inverted taper coupler, or a grating coupler in the PIC 802 and/or interposer 808. In the depicted embodiment, the PIC 802 and EIC 804 are flip-chip-bonded to the optical interposer 808 next to each other. It is, however, also possible to bond the EIC 804 directly to the PIC, which can provide the benefit of significantly reduced electrical connections from the EIC 804 to the electro-optic devices within the PIC 802.

FIG. 8B provides, in a schematic block-style top view, more detail about the components of the EIC 804 in accordance with an example embodiment. The depicted EIC 804 is a mixed-signal circuit, including analog-to-digital converters (ADCs) and digital-to-analog converters (DACs) to convert electronic signals between the analog and digital domains. The ADCs are provided at the outputs of transimpedance amplifiers (TIAs) that amplify the electronic output signal received from the photodetectors of the PIC 802, which constitute the activations generated by the linear network layer; TIAs and ADCs are collectively labeled 810. The DACs are provided at the inputs of drivers that provide the drive signals for the optical modulators of the PIC 802; drivers and DACs are collectively labeled 812.

In various neural network embodiments, drive signals are applied at least to the input cells in the photonic crossbar to provide the neuron inputs in electronic form to the optical linear neural network layer. The drivers of the input signals may operate at high frequency, e.g., at 50 GHz to apply a new neuron input to a given amplitude modulator every 20 ps. In some embodiments, drive signals are further applied to the weighting cells, typically at a much lower rate or quasi-statically. The weights may be updated once a large number of different sets of inputs have been processed, e.g., every one hundred clock cycles of the input for an interference application, to implement another neural network layer. In this manner, a single photonic crossbar can sequentially implement multiple neural network layers. For instance, the neuron outputs of one layer, as encoded in the optical output signals of the photonic crossbar, may be processed, after conversion into the electronic domain, to compute neuron inputs for the next layer, which are then fed back into the same photonic crossbar, now operated based on a new set of neuron weights. Alternatively, the processed neuron outputs from one crossbar may be provided as neuron inputs to another physical crossbar implemented on the PIC 802. Optionally, the processed outputs of the second crossbar, or of any additional crossbar, may eventually be fed back into the first crossbar. It is also possible for a photonic crossbar to implement a recurrent neural network layer, in which case the applied neuron weights remain the same as the neuron output of the recurrent layer is fed back into the layer as input.

With renewed reference to FIG. 8B, the EIC 804 may further include on-chip memory 814, e.g., static random access memory (SRAM) or other embedded non-volatile memory, such as magnetoresistive RAM (MRAM), resistive RAM (ReRAM), NOR flash memory, phase-change memory (PCM), etc. The memory 814 may store, for example, the weights to be applied to the modulators in the weighting cells, and/or intermediate data, such as (neuron) inputs to a computational (neural network) layer as computed from the outputs of the preceding layer. Weights may, alternatively, be stored directly in the PIC 802, e.g., using O-PCM.

The EIC 804 may be configured to perform various operations that cannot, or not as efficiently, be implemented in the photonic crossbar, including, in particular, non-multiple-accumulate (non-MAC) operations. The EIC 804 may, for example, apply an analog or digital non-linear activation function to the optically generated linear neuron outputs, although certain activation functions can also be implemented all-optically in the PIC 802. As another example, the EIC 804 may include a single instruction, multiple data (STMD) processor 816 that can efficiently perform pooling operations, e.g., in between photonically implemented convolutional layers of a neural network. In some embodiments, it is also beneficial to implement a fully-connected neural network layer electronically in the EIC 804. For example, in a photonic-electronic neuromorphic computing system 800 configured for image-recognition applications using a RES-NET50 model, the PIC 802 may implement the convolutional neural network layers, whereas the EIC 804 may handle the pooling layers and fully-connected layers of the model at higher bit precision than would be achievable with the PIC 802.

Apart from certain neural network operations, the EIC 804 may also perform pre- and post-processing of the neural network (or other computational) model and or its input and output. In some embodiments, a neural network model (or other model represented by a matrix) is rendered sparse by converting inessential network parameters (or matrix elements) to zero, without compromising accuracy. In addition, sparse input data may be pre-processed for more efficient storage in the on-chip memory 814. Image input data may be pre-processed to suppress undesired distortions or enhance relevant features, e.g., using Gaussian, wavelet, average, or median filters, fuzzy histogram hyperbolization, bias correction, or any of a variety of other techniques known in the field of image processing to generate better input features to the neural network. In some embodiments, the EIC 804 includes a graphic processing unit (GPU) for performing certain (e.g., image-processing) operations. Processing digital signals, beneficially, supports mixed-precision computations and can achieve higher bit precision (e.g., any combination of FP64, FP32, FP16, bfloat16, INT8, INT8 sparse, and INT4 operations) than photonic operations. In various embodiments, the PIC 802 can perform 4-bit or 8-bit operations (or mixed-precision operations combining 4-bit and 8-bit precision).

In various embodiments, the computing system 800 implements a trained neural network model with pre-computed neuron weights (e.g., as stored in the on-chip memory 814 or in O-PCM directly in the PIC 802) for a particular inference application. The machine-learning algorithm (e.g., backpropagation of errors with gradient descent) to determine the neuron weights may be implemented and executed, for example, using conventional computing hardware (e.g., a general-purpose processor or GPU). Alternatively, the neural network model may be trained in situ using the neuromorphic computing system 800, e.g., with neuron inputs processed optically by the PIC 802 in the forward propagation phase, and adjustments to the weights based on the neuron outputs being computed electronically, either directly by the EIC 804 (which, for this purpose, would be configured to implement the back-propagation phase of the algorithm) or by an additional computing device in communication with the EIC 804.

Figure 9:
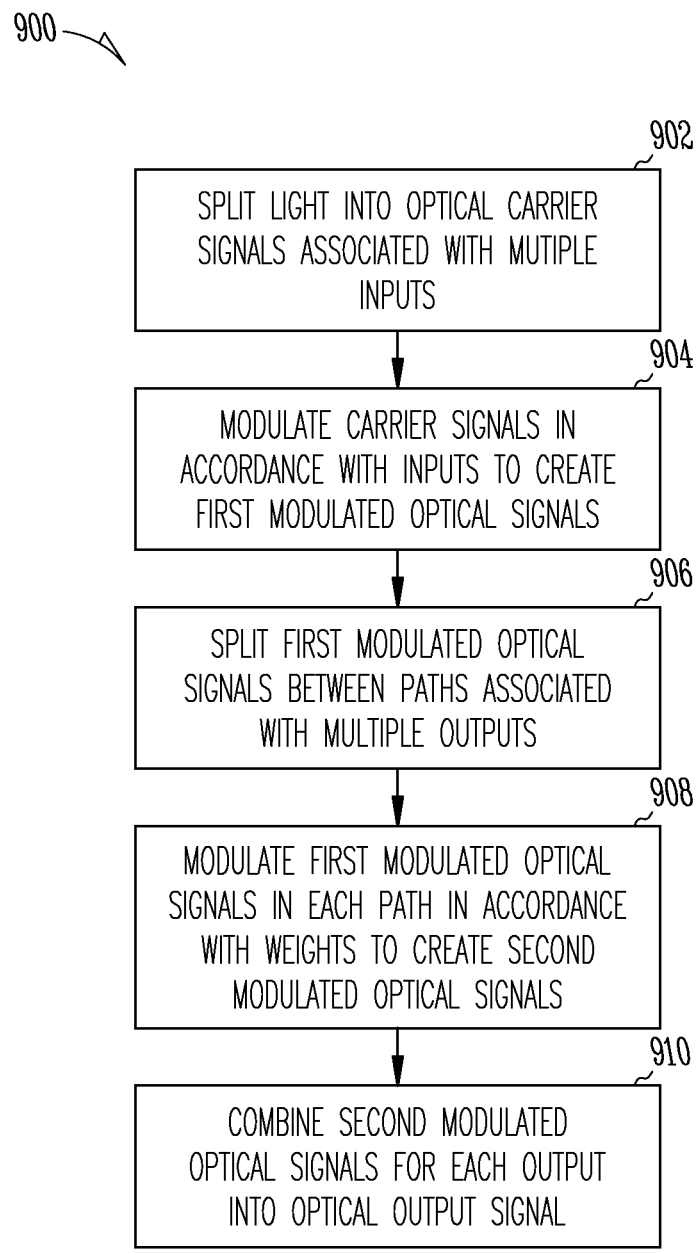
FIG. 9 is a flowchart of an example photonic computing method in accordance with various embodiments.

FIG. 9 is a flowchart of a photonic computing method 900 in accordance with various embodiments, as may be performed, e.g., using the photonic crossbar 300 or 700. The method 900 involves splitting light into a plurality of optical carrier signals associated with a plurality of computational inputs (902), and modulating amplitudes of the plurality of optical carrier signals to impart the computational inputs onto the optical carrier signals, thereby creating a plurality of first modulated optical signals (904). Each of the first modulated optical signals is split between a plurality of optical paths associated with a plurality of computational outputs (906). In an array configuration as used in photonic crossbars 300, 700, the optical paths associated with the same computational output lead the first modulated optical signals to the same column in the array. The amplitudes and/or phases of the first modulated optical signals in each of the plurality of optical paths are further modulated to impart computational weights and thereby generate second modulated optical signals (908). Each weight is associated with one of the plurality of computational inputs and one of the plurality of computational outputs, and from each first modulated optical signal (which encodes one of the computational inputs), multiple second modulated optical signals corresponding to the multiple computational outputs are generated. For each of the computational outputs, the second modulated optical signals in the associated paths are coherently combined (e.g., sequentially along an output waveguide merging the respective optical paths) into an optical output signal encoding the computational output (910).

In some embodiments, each optical carrier signal is modulated in accordance with one of the computational inputs to create a respective first modulated optical signal; each first modulated optical signal is modulated in accordance with multiple computational weights associated with multiple respective computational outputs to generate multiple respective second modulated optical signals associated with the computational input imparted on the first modulated optical signal; and second modulated optical signals associated with the same computational output are combined across the computational inputs into an optical output signal encoding one of the computational outputs.

In other embodiments, the optical carrier signals are multiplexed. In this case, for each individual optical carrier signal, multiple computational inputs may be imparted, e.g., by multiple modulators within a single input cell, on multiple respective wavelength components of the carrier signal to create multiple first modulated output signals, which may be multiplexed to propagate jointly to respective weighting cells associated with the input cell. Each weighting cell, in turn, may use either one modulator and phase shifter to impart the same weight on the multiplexed first modulated output signals, or multiple modulators and phase shifters to impart different weights on respective wavelength components corresponding to the individual first modulated output signals. It is also possible that each carrier signal is modulated, in the respective input cell, by only one modulator in accordance with one computational input to create one first modulated output signal with different wavelength components, and each weighting cell imparts different weights on the respective wavelength components. In any case, each weighting cell generates multiple second modulated optical signals at different respective wavelengths, which may be multiplexed and combined with other multiplexed second modulated optical signals into a single multiplexed optical output signal encoding multiple computational outputs on the different respective wavelengths.

The following numbered examples are illustrative embodiments.

Example 1 is a system comprising a photonic circuit that includes: an optical splitter configured to split carrier light into a plurality of optical carrier signals; a plurality of input cells comprising first optical amplitude modulators configured to impart a plurality of computational inputs onto the plurality of optical carrier signals to thereby create first modulated optical signals; a plurality of sets of weighting cells, the weighting cells in each set being coupled at their inputs to outputs of the plurality of input cells and comprising a plurality of second optical amplitude modulators configured to impart a plurality of computational weights onto the first modulated optical signals received from the input cells to thereby create second modulated optical signals associated with the set; and a plurality of optical combiners each associated with one of the sets of weighting cells and configured to coherently combine the second modulated optical signals associated with the set into an optical output signal.

Example 2 is the system of example 1, wherein the weighting cells of the plurality of sets are arranged in an array comprising a plurality of rows and a plurality of columns, each column of weighting cells corresponding to one of the sets of weighting cells, and each row of weighting cells being associated with and coupled to one of the input cells.

Example 3 is the system of example 2, wherein the photonic circuit further includes a plurality of optical input waveguides, each optical input waveguide being associated with one of the input cells and configured to guide the first modulated optical signal created in the input cell along the associated row of weighting cells, wherein optical taps placed along each of the optical input waveguides at inputs of the associated weighting cells couple the first modulated optical signal sequentially from the optical input waveguide into the associated weighting cells.

Example 4 is the system of example 3, wherein the optical taps along each of the optical input waveguides are configured to couple, to the associated weighting cells, fractions of an optical power guided in the optical input waveguide that increase in a direction of propagation of the first modulated optical signal, such that the first modulated optical signals coupled into the weighting cells are substantially equal in power along the optical input waveguide.

Example 5 is the system of any of examples 2 to 4, wherein each of the optical combiners comprises an optical output waveguide, and a plurality of optical couplers placed along the optical output waveguide and configured to sequentially couple the second modulated optical signals from the associated set of weighting cells into the optical output waveguide.

Example 6 is the system of any of examples 1 to 5, wherein the optical splitter and the optical combiners are collectively configured to cause the second modulated optical signals associated with each set of weighting cells to be combined into the corresponding optical output signals in equal proportions.

Example 7 is the system of any of examples 1 to 6, wherein the optical splitter comprises a cascade of bifurcating splitters that couple the carrier light sequentially to inputs of the plurality of input cells.

Example 8 is the system of any of examples 1 to 7, wherein the photonic circuit further includes a plurality of optical delay lines imparting optical delays on the first modulated optical signals to balance optical path lengths between the input cells and an optical output of each of the optical combiners.

Example 9 is the system of any of examples 1 to 8, wherein at least one of the first optical amplitude modulators or the second optical amplitude modulators comprise electro-absorption modulators or multi-quantum-confined Stark effect (QCSE) electro-absorption modulators.

Example 10 is the system of any of examples 1 to 9, wherein the second optical amplitude modulators comprise optical phase change cells.

Example 11 is the system of any of examples 1 to 10, wherein the weighting cells in each set further comprise a plurality of phase shifters associated with the plurality of second amplitude modulators, configurable to impart signs of the computational weights onto the first modulated optical signals.

Example 12 is the system of example 11, wherein the phase shifters comprise at least one of a thermal phase shifter, an electro-optic phase shifter, or a phase-change-material-based phase shifter.

Example 13 is the system of any of examples 1 to 11, wherein the photonic circuit further includes a plurality of photodetectors placed at optical outputs of the plurality of optical combiners to measure the optical output signals.

Example 14 is the system of any of examples 1 to 13, further comprising: electronic circuitry configured to control drivers associated with the plurality of first optical amplitude modulators, the plurality of second optical amplitude modulators, and the plurality of phase shifters, the electronic circuitry comprising memory storing the computational weights associated with the plurality of weighting cells.

Example 15 is the system of examples 13 and 14, wherein the optical splitter, the plurality of input cells, the plurality of sets of weighting cells, the plurality of optical combiners, and the plurality of photodetectors implement a first neural network layer, the photonic circuit further comprising an additional optical splitter, an additional plurality of input cells, an additional plurality of sets of weighting cells, an additional plurality of optical combiners, and an additional plurality of photodetectors implementing a second neural network layer, the electronic circuitry being configured to control drivers associated with additional first optical amplitude modulators in the additional input cells of the second layer based on outputs of the plurality of photodetectors of the first layer.

Example 16 is the system of examples 13 and 14, wherein the electronic circuitry is configured to: cause a first set of computational weights associated with a first neural network layer to be applied by the plurality of sets of weighting cells; as the first set of computational weights is applied, causing a first set of computational inputs to be applied by the first optical amplitude modulators and reading out the photodetectors measuring the optical output signals to obtain a first set of computational outputs associated with the first layer; causing a second set of computational weights associated with a second neural network layer to be applied by the weighting cells; and as the second set of computational weights is applied, causing a second set of computational inputs based on the first set of computational outputs to be applied by the first optical amplitude modulators and reading out the photodetectors measuring the optical output signals to obtain a second set of computational outputs associated with the second layer.

Example 17 is the system of any of examples 1 to 16, wherein: each of the input cells is associated with a respective one of the computational inputs and configured to impart that computational input, with one of the first optical amplitude modulators, on one of the optical carrier signals to create one of the first modulated optical signals; and each of the optical combiners and its associated optical output signal are associated with a respective one of a plurality of computational outputs; and each of the weighting cells is associated with a respective pair of one of the computational inputs and one of the computational outputs, and configured to impart, using one of the second amplitude modulators, one of the computational weights on the first modulated optical signals associated with that computational input to create one of the second modulated optical signals.

Example 18 is the system of any of examples 1 to 16, wherein the carrier light is multiplexed light, the optical carrier signals are multiplexed optical carrier signals, and the optical output signals are multiplexed optical output signals.

Example 19 is the system of example 18, wherein the input cells each comprise a set of multiple first optical amplitude modulators associated with multiple wavelengths of the multiplexed optical carrier signals, preceded by a demultiplexer and followed by a multiplexer, the multiple first optical amplitude modulators in each input cell configured to create multiple respective first modulated optical signals by imparting multiple computational inputs onto the multiple wavelengths of the multiplexed optical carrier signals.

Example 20 is the system of example 18 or example 19, wherein the weighting cells each comprise a set of multiple second optical amplitude modulators and/or phase shifters associated with multiple wavelengths of the multiplexed optical carrier signals, preceded by a demultiplexer and followed by a multiplexer, the multiple second optical amplitude modulators and/or phase shifters configured to create multiple respective second modulated optical signals by imparting multiple computational weights onto one or more first modulated optical signals.

Example 21 is the system of example 18, further comprising electro-optic switches preceding and following each of the input cells and each of the weighting cells, the electro-optic switches configurable to direct the multiplexed optical input signals along first or second input optical paths through the input cells and along first or second weighting optical paths through the weighting cells, wherein: each of the input cells comprises a set of first optical amplitude modulators associated with multiple wavelengths of the multiplexed optical carrier signals and preceded by a demultiplexer and followed by a multiplexer along the first input optical path, and a separate first optical amplitude modulator along the second input optical path; and each of the weighting cells comprises a set of second optical amplitude modulators and/or phase shifters associated with multiple wavelengths of the multiplexed optical carrier signals and preceded by a demultiplexer and followed by a multiplexer along the first weighting optical path, and a separate second optical amplitude modulator and/or phase shifter along the second weighting optical path.

Example 22 is the system of example 21, wherein the electro-optic switches are programmable for a plurality of configurations implementing a plurality of associated artificial neural network types, the plurality of configurations comprising: a convolutional neural network configuration in which the multiplexed optical carrier signals are directed along the first input optical paths and the second weighting optical paths; a fully connected neural network configuration in which the multiplexed optical carrier signals are directed along the second input optical paths and the first weighting optical paths; and a neural network configuration in which the multiplexed optical input signals are directed along the first input optical paths and the first weighting optical paths.

Example 23 is a photonic circuit comprising: an optical splitter configured to split multiplexed light into a plurality of multiplexed optical carrier signals associated with a plurality of inputs; a plurality of interferometric optical paths configured to receive the plurality of multiplexed optical carrier signals and generate multiplexed weighted optical input signals; and an optical combiner configured to combine the multiplexed weighted optical input signals into a multiplexed optical output signal, wherein each of the interferometric optical paths comprises: a first electro-optical switch, a second electro-optical switch, and a third electro-optical switch, the first and second electro-optical switches configurable to switch the multiplexed optical carrier signal between first and second input optical paths and the second and third electro-optical switches configurable to switch multiplexed optical input signal between first and second weighting optical paths; between the first and second electro-optical switches, an input cell comprising a set of first optical amplitude modulators associated with multiple wavelengths of the multiplexed optical carrier signals and preceded by a demultiplexer and followed by a multiplexer along the first input optical path, and a separate first optical amplitude modulator along the second input optical path, the input cell configured to generate the multiplexed optical input signal; and between the second and third electro-optical switches, a weighting cell comprising a set of second optical amplitude modulators and phase shifters associated with multiple wavelengths of the multiplexed optical carrier signals and preceded by a demultiplexer and followed by a multiplexer along the first weighting optical path, and a separate second optical amplitude modulator and phase shifter along the second weighting optical path, the weighting cell configured to generate the multiplexed weighted optical input signal.

Example 24 is the photonic circuit of example 23, further comprising a demultiplexer at an output of the optical combiner, the demultiplexer configured to separate the multiplexed optical output signal into optical output signals of multiple wavelengths.

Example 25 is the photonic circuit of example 24, further comprising a plurality of photodetectors to measure the optical output signals at the multiple wavelengths.

Example 26 is a photonic computing method comprising: splitting light into a plurality of optical carrier signals associated with a plurality of computational inputs; modulating amplitudes of the plurality of optical carrier signals to impart the computational inputs onto the optical carrier signals, thereby creating a plurality of first modulated optical signals; splitting each of the optical input signals between a plurality of optical paths associated with a plurality of computational outputs; modulating amplitudes and/or phases of the first modulated optical signals in each of the plurality of optical paths to impart computational weights, each associated with one of the plurality of computational inputs and one of the plurality of computational outputs, onto the first modulated optical signals, thereby generating second modulated optical signals; and coherently combining, for each of the computational outputs, the second modulated optical signals in optical paths associated with the computational output into an optical output signal encoding the computational output.

Example 27 is the method of example 26, wherein each of the optical carrier signals is associated with one of the plurality of computational inputs, and each of the optical output signals is associated with one of the plurality of computational outputs.

Example 28 is the method of example 26, wherein the light is multiplexed light comprising multiple wavelengths, the optical carrier signals are multiplexed optical carrier signals each associated with multiple computational inputs imparted on the optical carrier signal at the multiple wavelengths to create multiple first modulated optical signals, and the optical output signals are multiplexed optical output signals associated with multiple computational outputs encoded in the optical output signal at the multiple wavelengths.

Example 29 is a computing system comprising: a photonic integrated circuit (PIC) implementing one or more computational layers, the PIC comprising: one or more coherent photonic crossbars each configured to modulate a plurality of optical input signals to impart computational weights associated with a plurality of sets of weights onto the optical input signals to create weighted optical input signals, and to coherently combine the weighted optical input signals to generate optical output signals encoding computational outputs associated with the plurality of sets of weights, at least one of the one or more coherent photonic crossbars comprising a plurality of electronically controlled modulators to impart computational inputs onto coherent optical carrier signals to generate the plurality of optical input signals, and at least one of the one or more coherent photonic crossbars comprising a plurality of photodetectors to generate analog electronic output signals based on the optical output signals; and a mixed-signal electronic integrated circuit (EIC) comprising: driver circuitry to control the modulators in the PIC in accordance with neuron inputs, and processing circuitry to process the analog electronic output signals, the processing being performed at least partially digitally.

Example 30 is the computing system of example 29, wherein the one or more coherent photonic crossbars implement multiple computational layers.

Example 31 is the computing system of example 30, wherein the analog electronic output signals associated with one of the multiple computational layers are processed to generate control signals for the driver circuitry associated with the inputs of another one of the computational layers.

Example 32 is the computing system of any of examples 29 to 31, wherein at least one of the one or more coherent photonic crossbars comprises a plurality of additional electronically controlled modulators to impart the computational weights onto the optical input signals, and wherein the EIC further comprises additional driver circuitry to control the additional modulators.

Example 33 is the computing system of example 31 and example 32, wherein the one of the computational layers and the other one of the computational layers are implemented by a single one of the one or more coherent photonic crossbars, and wherein the additional driver circuitry controls the additional modulators in accordance with one set of computational weights to implement the one of the computational layers and in accordance with another set of computational weights to implement the other one of the computational layers.

Example 34 is the computing system of example 32 or example 33, wherein the EIC further comprises memory storing the computational weights and digital-to-analog converters to generate, from the computational weights, control signals for the additional driver circuitry.

Example 35 is the computing system of any of examples 32 to 34, wherein the additional electronically controlled modulators comprise pairs of an amplitude modulator and a phase shifter to impart signed computational weights onto electric fields of the optical input signals.

Example 36 is the computing system of example 31 or example 32, wherein the one of the computational layers and the other one of the computational layers are implemented by two coherent photonic crossbars.

Example 37 is the computing system of claim 30, wherein the multiple computational layers are implemented by multiple coherent photonic crossbars, and wherein the optical output signals of at least one of the coherent photonic crossbars are provided to another one of the coherent photonic crossbars as the optical input signals.

Example 38 is the computing system of any of examples 29 to 37, further comprising at least one of optical amplifiers in the PIC to amplify the optical output signals or electronic amplifiers in the processing circuitry to amplify the analog electronic output signal.

Example 39 is the computing system of any of examples 29 to 38, wherein the one or more computational layers represent one or more neural network layers, the plurality of sets of weights represent a plurality of neurons, and the computational outputs are linear neuron outputs.

Example 40 is the computing system of example 39, wherein the processing circuitry applies a non-linear electronic activation function to the analog electronic signals either in an analog domain or in a digital domain following analog-to-digital conversion.

Example 41 is the computing system of example 39, wherein the PIC further comprises non-linear activation units associated with the neurons of at least one of the one or more coherent photonic crossbars, the non-linear optical activation units configured to apply an optical non-linearity to the optical output signals encoding the linear neurons outputs to thereby generate optical output signals encoding non-linear neuron outputs.

Example 42 is the computing system of any of examples 39 to 41, wherein the digital processing comprises a neural-network-layer operation.

Example 43 is the computing system of example 42, wherein the neural-network-layer operation implements one of a pooling layer or a fully connected layer.

Example 44 is the computing system of any of examples 39 to 43, wherein the digital processing comprises an image pre-processing operation for image input to the one or more neural network layers or a post-processing operation of output generated by the one or more neural network layers.

Example 45 is the computing system of example 44, wherein the digital processing comprises adjusting stored neural network weights to enable structural sparsity.

Example 46 is the computing system of any of examples 29 to 45, wherein at least one of the PIC or the EIC is configured to perform mixed-precision operations.

Example 47 is the computing system of any of examples 29 to 46, wherein the EIC further comprises a graphic processing unit (GPU) core to perform at least part of the digital processing.

Example 48 is the computing system of any of examples 29 to 47, wherein the EIC further comprises on-chip memory.

Example 49 is the computing system of any of examples 29 to 48, further comprising an electronic interface between the PIC and the EIC, the electronic interface having a power consumption of less than 3 pJ per bit of data converted from an optical domain to a digital electronic domain or from a digital electronic domain to an optical domain.

Example 50 is the computing system of any of examples 29 to 49, the PIC further comprising an optical splitter that receives carrier light from a light engine and splits it into the coherent optical carrier signals.

Example 51 is the computing system of example 50, wherein the light engine comprises a plurality of lasers generating light at multiple wavelengths and a multiplexer to combine the light at the multiple wavelengths into multiplexed carrier light.

Example 52 is the computing system of any of examples 29 to 51, the PIC further comprising an optical interface that receives carrier light from a source external to the PIC, the optical interface comprising at least one of an edge coupler, inverted taper coupler, or grating coupler.

Example 53 is the computing system of claim 52, wherein the optical interface comprises at least one of an edge coupler, an inverted taper coupler, or a grating coupler.

Example 54 is the computing system of any of example 29 to 53, wherein the digital processing comprises operations performed at higher bit precision than operations performed in the PIC.

Although the inventive subject matter has been described with reference to specific example embodiments, it will be evident that various modifications and changes may be made to these embodiments without departing from the broader scope of the inventive subject matter. Accordingly, the specification and drawings are to be regarded in an illustrative rather than a restrictive sense.

What is claimed is:

1. A system comprising a photonic circuit that includes:
    an optical splitter configured to split carrier light into a plurality of optical carrier signals;
    a plurality of input cells comprising first optical amplitude modulators configured to impart a plurality of computational inputs onto the plurality of optical carrier signals to thereby output first modulated optical signals;

a plurality of sets of weighting cells, the weighting cells in each set being coupled at their inputs to outputs of the plurality of input cells and comprising a plurality of second optical amplitude modulators configured to impart a plurality of computational weights onto the first modulated optical signals received from the input cells to thereby output second modulated optical signals associated with the set; and a plurality of optical combiners each associated with one of the sets of weighting cells and configured to coherently combine the second modulated optical signals associated with the set into an optical output signal.

2. The system of claim 1, wherein the weighting cells of the plurality of sets are arranged in an array comprising a plurality of rows and a plurality of columns, each column of weighting cells corresponding to one of the sets of weighting cells, and each row of weighting cells being associated with and coupled to one of the input cells.

3. The system of claim 2, wherein the photonic circuit further includes a plurality of optical input waveguides, each optical input waveguide being associated with one of the input cells and configured to guide the first modulated optical signals output in the input cell along the associated row of weighting cells, wherein optical taps placed along each of the optical input waveguides at inputs of the associated weighting cells couple the first modulated optical signal sequentially from the optical input waveguide into the associated weighting cells.

4. The system of claim 3, wherein the optical taps along each of the optical input waveguides are configured to:
couple, to the associated weighting cells, a first portion of an optical power guided in the optical input waveguide that increase in a direction of propagation of the first modulated optical signal, such that the first modulated optical signals coupled into the weighting cells are substantially equal in power along the optical input waveguide; and
pass, to one or more additional weighting cells, a second portion of the optical power.

5. The system of claim 2, wherein each of the optical combiners comprises an optical output waveguide and a plurality of optical couplers placed along the optical output waveguide and configured to sequentially couple the second modulated optical signals from the associated set of weighting cells into the optical output waveguide.

6. The system of claim 1, wherein the optical splitter and the optical combiners are collectively configured to cause the second modulated optical signals associated with each set of weighting cells to be combined into corresponding optical output signals in equal proportions.

7. The system of claim 1, wherein the optical splitter comprises a cascade of bifurcating splitters that couple the carrier light sequentially to inputs of the plurality of input cells.

8. The system of claim 1, wherein the photonic circuit further includes a plurality of optical delay lines imparting optical delays on the second modulated optical signals to balance optical path lengths between the input cells and an optical output of each of the optical combiners.

9. The system of claim 1, wherein at least one of the first optical amplitude modulators or the second optical amplitude modulators comprise electro-absorption modulators or multi-quantum-confined Stark effect (QCSE) electro-absorption modulators.

10. The system of claim 1, wherein the second optical amplitude modulators comprise optical phase change cells.

11. They system of claim 1, wherein the weighting cells in each set further comprise a plurality of phase shifters associated with the plurality of second amplitude modulators, configurable to impart signs of the computational weights onto the first modulated optical signals.

12. The system of claim 11, wherein the phase shifters comprise at least one of a thermal phase shifter, an electro-optic phase shifter, or a phase-change-material-based phase shifter.

13. The system of claim 1, wherein the photonic circuit further includes a plurality of photodetectors placed at optical outputs of the plurality of optical combiners to measure the optical output signals.

14. The system of claim 11, further comprising:
electronic circuitry configured to control drivers associated with the plurality of first optical amplitude modulators, the plurality of second optical amplitude modulators, and the plurality of phase shifters, the electronic circuitry comprising memory storing the computational weights associated with the plurality of weighting cells.

15. The system of claim 14, wherein the optical splitter, the plurality of input cells, the plurality of sets of weighting cells, the plurality of optical combiners, and the plurality of photodetectors implement a first neural network layer, the photonic circuit further comprising an additional optical splitter, an additional plurality of input cells, an additional plurality of sets of weighting cells, an additional plurality of optical combiners, and an additional plurality of photodetectors implementing a second neural network layer, the electronic circuitry being configured to control drivers associated with additional first optical amplitude modulators in the additional input cells of the second layer based on outputs of the plurality of photodetectors of the first layer.

16. The system of claim 14, wherein the electronic circuitry is configured to:
cause a first set of computational weights associated with a first neural network layer to be applied by the plurality of sets of weighting cells;
as the first set of computational weights is applied, causing a first set of computational inputs to be applied by the first optical amplitude modulators and reading out the photodetectors measuring the optical output signals to obtain a first set of computational outputs associated with the first layer;
causing a second set of computational weights associated with a second neural network layer to be applied by the weighting cells; and
as the second set of computational weights is applied, causing a second set of computational inputs based on the first set of computational outputs to be applied by the first optical amplitude modulators and reading out the photodetectors measuring the optical output signals to obtain a second set of computational outputs associated with the second layer.

17. The system of claim 1, wherein:
each of the input cells is associated with a respective one of the computational inputs and configured to impart that computational input, with one of the first optical amplitude modulators, on one of the optical carrier signals to output one of the first modulated optical signals;
each of the optical combiners and its associated optical output signal are associated with a respective one of a plurality of computational outputs; and
each of the weighting cells is associated with a respective pair of one of the computational inputs and one of the computational outputs, and configured to impart, using one of the second amplitude modulators, one of the computational weights on the first modulated optical signals associated with that computational input to output one of the second modulated optical signals.

18. The system of claim 1, wherein the carrier light is multiplexed light, the optical carrier signals are multiplexed optical carrier signals, and the optical output signals are multiplexed optical output signals.

19. The system of claim 18, wherein the input cells each comprise a set of multiple first optical amplitude modulators associated with multiple wavelengths of the multiplexed optical carrier signals, preceded by a demultiplexer and followed by a multiplexer, the multiple first optical amplitude modulators in each input cell configured to output multiple respective first modulated optical signals by imparting multiple computational inputs onto the multiple wavelengths of the multiplexed optical carrier signals.

20. The system of claim 18, wherein the weighting cells each comprise a set of multiple second optical amplitude modulators and/or phase shifters associated with multiple wavelengths of the multiplexed optical carrier signals, preceded by a demultiplexer and followed by a multiplexer, the multiple second optical amplitude modulators and/or phase shifters configured to output multiple respective second modulated optical signals by imparting multiple computational weights onto one or more first modulated optical signals.

21. The system of claim 18, further comprising electro-optic switches preceding and following each of the input cells and each of the weighting cells, the electro-optic switches configurable to direct multiplexed optical input signals along first or second input optical paths through the input cells and along first or second weighting optical paths through the weighting cells, wherein:
each of the input cells comprises a set of first optical amplitude modulators associated with multiple wavelengths of the multiplexed optical carrier signals and preceded by a demultiplexer and followed by a multiplexer along the first input optical path, and a separate first optical amplitude modulator along the second input optical path; and
each of the weighting cells comprises a set of second optical amplitude modulators and/or phase shifters associated with multiple wavelengths of the multiplexed optical carrier signals and preceded by a demultiplexer and followed by a multiplexer along the first weighting optical path, and a separate second optical amplitude modulator and/or phase shifter along the second weighting optical path.

22. The system of claim 21, wherein the electro-optic switches are programmable for a plurality of configurations implementing a plurality of associated artificial neural network types, the plurality of configurations comprising:
a convolutional neural network configuration in which the multiplexed optical carrier signals are directed along the first input optical paths and the second weighting optical paths;
a fully connected neural network configuration in which the multiplexed optical carrier signals are directed along the second input optical paths and the first weighting optical paths; and
a neural network configuration in which the multiplexed optical input signals are directed along the first input optical paths and the first weighting optical paths.

23. A photonic circuit comprising:
an optical splitter configured to split multiplexed light into a plurality of multiplexed optical carrier signals associated with a plurality of inputs;
a plurality of interferometric optical paths configured to receive the plurality of multiplexed optical carrier signals and generate multiplexed weighted optical input signals; and
an optical combiner configured to combine the multiplexed weighted optical input signals into a multiplexed optical output signal,
wherein each interferometric optical path of the plurality of interferometric optical paths comprises:
a first electro-optical switch, a second electro-optical switch, and a third electro-optical switch, the first and second electro-optical switches configurable to switch the plurality of multiplexed optical carrier signals between first and second input optical paths and the second and third electro-optical switches configurable to switch multiplexed optical input signals between first and second weighting optical paths;
between the first and second electro-optical switches, an input cell comprising a set of first optical amplitude modulators associated with multiple wavelengths of the plurality of multiplexed optical carrier signals and preceded by a demultiplexer and followed by a multiplexer along the first input optical path, and a separate first optical amplitude modulator along the second input optical path, the input cell configured to generate the multiplexed optical input signals; and
between the second and third electro-optical switches, a weighting cell comprising a set of second optical amplitude modulators and phase shifters associated with multiple wavelengths of the plurality of multiplexed optical carrier signals and preceded by a demultiplexer and followed by a multiplexer along the first weighting optical path, and a separate second optical amplitude modulator and phase shifter along the second weighting optical path, the weighting cell configured to generate the multiplexed weighted optical input signals.

24. The photonic circuit of claim 23, further comprising a demultiplexer at an output of the optical combiner, the demultiplexer configured to separate the multiplexed optical output signal into optical output signals of multiple wavelengths.

25. The photonic circuit of claim 24, further comprising a plurality of photodetectors to measure the optical output signals at the multiple wavelengths.

26. A photonic computing method comprising:
splitting light into a plurality of optical carrier signals associated with a plurality of computational inputs;
modulating amplitudes of the plurality of optical carrier signals to impart the computational inputs onto the optical carrier signals, thereby outputting a plurality of first modulated optical signals;
splitting each of the optical input signals between a plurality of optical paths associated with a plurality of computational outputs;
modulating amplitudes and/or phases of the first modulated optical signals in each of the plurality of optical paths to impart computational weights, each associated with one of the plurality of computational inputs and one of the plurality of computational outputs, onto the first modulated optical signals, thereby generating second modulated optical signals; and coherently combining, for each of the computational outputs, the second modulated optical signals in optical paths associated with the computational output into an optical output signal encoding the computational output.

27. The method of claim 26, wherein each of the optical carrier signals is associated with one of the plurality of computational inputs, and each of the optical output signals is associated with one of the plurality of computational outputs.

28. The method of claim 26, wherein the light is multiplexed light comprising multiple wavelengths, the optical carrier signals are multiplexed optical carrier signals each associated with multiple computational inputs imparted on the optical carrier signal at the multiple wavelengths to output multiple first modulated optical signals, and the optical output signals are multiplexed optical output signals associated with multiple computational outputs encoded in the optical output signal at the multiple wavelengths.

\* \* \* \* \*